United States Patent
D'Agostino et al.

(10) Patent No.: US 12,502,075 B2
(45) Date of Patent: Dec. 23, 2025

(54) COORDINATED PROCESSING AND SCHEDULING FOR SURGICAL PROCEDURES

(71) Applicant: DOC BUDDY INC., Greenwood Village, CO (US)

(72) Inventors: Philip A. D'Agostino, Greenwood Village, CO (US); Jason A. Dell, Highlands Ranch, CO (US); Ashley A. Bye, St. Louis Park, MN (US)

(73) Assignee: DOC BUDDY INC., Greenwood Village, CO (US)

( * ) Notice: Subject to any disclaimer, the term of this patent is extended or adjusted under 35 U.S.C. 154(b) by 475 days.

(21) Appl. No.: 17/818,257

(22) Filed: Aug. 8, 2022

(65) Prior Publication Data
US 2023/0044881 A1 Feb. 9, 2023

Related U.S. Application Data

(60) Provisional application No. 63/230,909, filed on Aug. 9, 2021.

(51) Int. Cl.
*G16H 10/60* (2018.01)
*A61B 5/00* (2006.01)

(52) U.S. Cl.
CPC .......... *A61B 5/0022* (2013.01); *G16H 10/60* (2018.01)

(58) Field of Classification Search
None
See application file for complete search history.

(56) References Cited

U.S. PATENT DOCUMENTS

| | | | |
|---|---|---|---|
| 2016/0063192 A1* | 3/2016 | Johnson | G16H 40/20 705/2 |
| 2021/0193302 A1* | 6/2021 | Day | G06Q 10/0631 |
| 2022/0183757 A1* | 6/2022 | Caldera | A61B 90/39 |

OTHER PUBLICATIONS

Erdogan et al. ("Surgery planning and scheduling." Wiley encyclopedia of operations research and management science. Hoboken, NJ, USA: Wiley, 2011) (Year: 2011).*

* cited by examiner

*Primary Examiner* — Christopher B Tokarczyk
(74) *Attorney, Agent, or Firm* — Dorsey & Whitney LLP

(57) ABSTRACT

An example method includes receiving a request to create a surgical case corresponding to a patient identifier and a provider identifier and associating one or more of patient data and provider data with the surgical case based on the patient identifier or the provider identifier. Case data is retrieved from a medical management system using one or more of the patient identifier and the provider identifier to query the medical management system. A workflow state for the surgical case is initialized by setting statuses for preconfigured workflow items based on the case data. A view of the surgical case is displayed via a user interface. The view of the surgical case displays at least a portion of the case data and includes one or more status elements configured based on the workflow state for the surgical case.

20 Claims, 13 Drawing Sheets

Schedule

Calendar  List  Rooms

| | Apr 20 | Dr. Surgeon | Room | Status | Patient |
|---|---|---|---|---|---|

| | Date, Time, Duration | Name, Age, Gender | Case | Provider | Status | Appt. Type | Room | Workflow |
|---|---|---|---|---|---|---|---|---|
| ☐ | April 20 8:00am, 120 min | Holmes, Sherlock, 42, M | Left Hip | Dr. Surgeon | Scheduled | Surgery | OR 2 | ◯◯◯●◯ ◯◯◯◯ |
| ☐ | April 20 11:00am, 60 min | March, Josephine, 25, F | Left Knee | Dr. Surgeon | Confirmed | Surgery | OR 1 | ◯◯●◯◯ ◯◯◯◯ |

502a — (first row)
502b — (second row)

FIG. 6

COORDINATED PROCESSING AND SCHEDULING FOR SURGICAL PROCEDURES

CROSS-REFERENCE TO RELATED APPLICATIONS

The present application claims the benefit of priority to U.S. Provisional Patent Application No. 63/230,909, filed Aug. 8, 2021, entitled "COORDINATED PROCESSING AND SCHEDULING FOR SURGICAL PROCEDURES," the disclosure of which is incorporated herein by reference in its entirety.

BACKGROUND

Surgical procedures are often scheduled at surgery centers, which may use management software or other systems incompatible with electronic medical records (EMR), practice management (PM) systems, and the like. Accordingly, obtaining information for scheduling procedures, tracking documents (e.g., consents), and managing the process of scheduling a procedure is often difficult and cumbersome. Physicians, staff, and other providers may have difficulty accessing information about surgical procedures.

SUMMARY

An example method includes receiving a request to create a surgical case corresponding to a patient identifier and a provider identifier and associating one or more of patient data and provider data with the surgical case based on the patient identifier or the provider identifier. Case data is retrieved from a medical management system using one or more of the patient identifier and the provider identifier to query the medical management system. A workflow state for the surgical case is initialized by setting statuses for pre-configured workflow items based on the case data. A view of the surgical case is displayed via a user interface. The view of the surgical case displays at least a portion of the case data and includes one or more status elements configured based on the workflow state for the surgical case.

Another example method includes receiving a request to render views of surgical cases associated with one or more identifiers at a user interface and identifying the surgical cases associated with the one or more identifiers based on case data associated with the surgical cases. At least a portion of the case data is obtained from a medical management system using one of the one or more identifiers to query the medical management system. A view is configured for each of the surgical cases. The views display at least a portion of the case data associated with the surgical cases and include one or more status elements configured based on a workflow state for the surgical cases. The configured views are provided to the user interface.

One or more example non-transitory computer readable media are encoded with instructions which, when executed by one or more processors of a surgical coordination system, cause the surgical coordination to receive a request to create a surgical case corresponding to a patient identifier and a provider identifier and to associate one or more of patient data and provider data with the surgical case based on the patient identifier or the provider identifier. The instructions further cause the surgical coordination system to retrieve case data from a medical management system using one or more of the patient identifier and the provider identifier to query the medical management system and to initialize a workflow state for the surgical case by setting statuses for preconfigured workflow items based on the case data. The instructions further cause the surgical coordination system to display, via a user interface, a view of the surgical case. The view of the surgical case displays at least a portion of the case data and includes one or more status elements configured based on the workflow state for the surgical case.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that:

FIG. 4 illustrates an example user interface displaying surgical case data associated with a provider identifier and a temporal identifier, in accordance with various embodiments of the disclosure.

FIG. 5 illustrates an example user interface displaying surgical case data, in accordance with various embodiments of the disclosure.

FIG. 6 illustrates an example user interface displaying surgical case data associated with a provider identifier and a temporal identifier, in accordance with various embodiments of the disclosure.

DETAILED DESCRIPTION

Figure 1:
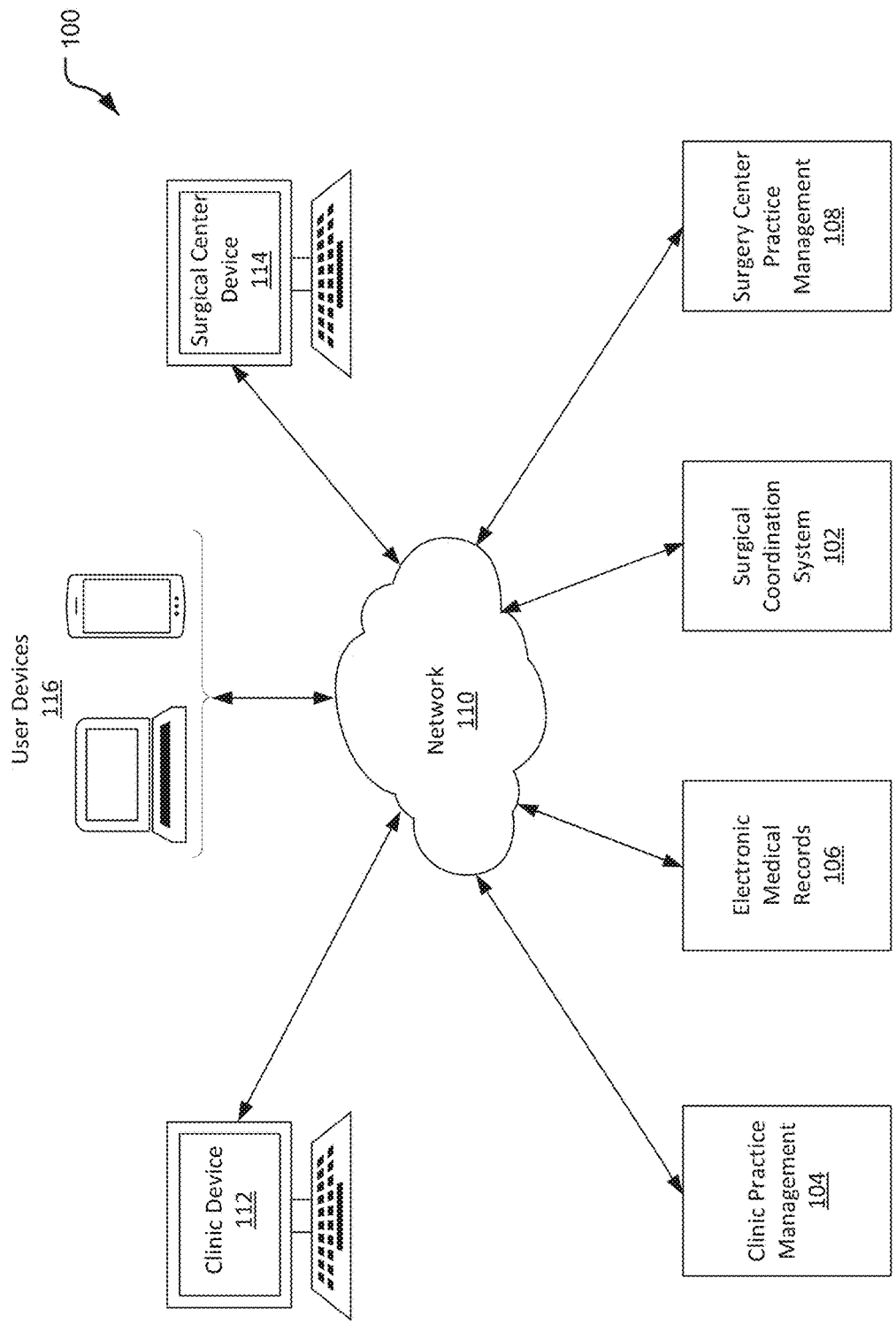
FIG. 1 illustrates an example surgical coordination system and various systems in communication with the surgical coordination system through a network, in accordance with various embodiments of the disclosure.

Scheduling surgical procedures at surgical centers or locations separate from a clinic location may be an involved process involving several enterprise software systems, faxing or mailing of physical requests, and managing information from a variety of sources. For example, a provider may provide a pre-surgical consultation to a patient at a clinic location. The patient's records may be located in an electronic medical records (EMR) system and the clinic may use a clinic practice management system to schedule appointments, track billing, track patient contacts, and perform other functions for the clinic. The provider may put in an order for a surgical procedure at a particular surgical center (e.g., an ambulatory surgical center) using a surgical center practice management system to schedule procedures and perform billing. Surgical centers may use other medical management systems (e.g., scanning software) and/or paper files to keep records and track items needed for surgery (such as confirmation of provider insurance and patient consents). Each of the medical management systems (e.g., the EMR, clinic practice management, surgical center practice management, and scanning software) may be separate systems such that duplication of data is used to provide the various medical management systems with the same information. In some cases, each medical management system may include some information, such that there is not a centralized system with all information about a procedure. The incompatibility of systems may result in loss of information, inefficiencies in scheduling and completing surgical procedures, and additional resource usage.

The surgical coordination system described herein may provide a centralized system interfacing with various medical management systems to consolidate information about surgical procedures as well as tracking various tasks (e.g., a pre and post-surgery workflow for clinic and surgery center staff) involved with scheduling and completing surgical procedures. The surgical coordination system may further store records regarding surgical cases and/or may provide information to various medical management systems, providing consistency of records across various platforms. In various examples, the surgical coordination system may further provide user interfaces allowing users with access to the surgical coordination system (e.g., providers, administrators, schedulers, and other staff) to accurately track tasks associated with surgical cases, such that important workflow items, such as verifying insurance or obtaining patient consent to a procedure, are less likely to be overlooked when scheduling a procedure, which may reduce cancellations, billing challenges, and the like.

The surgical coordination system described herein may further provide user interfaces with aesthetic and other features which may be utilized to track various tasks associated with surgical procedures. For example, user interfaces may include graphical elements allowing users to view completion status of various tasks associated with surgical procedures. Such user interfaces may further include graphical elements displaying various information about scheduled surgical cases in easy to read formats. Various embodiments of the present disclosure will be explained below in detail with reference to the accompanying drawings. Other embodiments may be utilized, and structural, logical and electrical changes may be made without departing from the scope of the present disclosure.

Turning now to the drawings, FIG. 1 illustrates an example surgical coordination system 102. The surgical coordination system 102 as disclosed herein may coordinate between multiple management systems to manage various aspects of scheduling, planning, and recordkeeping for surgical procedures. Management systems may include, in various embodiments, electronic medical records (EMR) systems, clinic practice management (PM) systems, surgery center practice management (SPM) systems, insurance systems, patient portals, pharmacy management systems and other systems used to manage various aspects of healthcare. The surgical coordination system 102 may, in some examples, also provide recordkeeping or shared document management for surgical procedures, and such records and/or documents may be accessible by the management systems in communication with the surgical coordination system 102.

The surgical coordination system 102 may generally communicate with various medical management systems, such as clinic practice management 104, electronic medical records 106, and surgery center practice management 108 to receive requests for new surgical cases, obtain case data for surgical cases managed by the surgical coordination system 102, and provide information and records regarding surgical cases to the medical management systems. In various embodiments, the surgical coordination system 102 may communicate with medical management systems to provide or receive additional information, such as to update a workflow status for a surgical case, to convey requests to schedule surgical procedures, and the like. For example, the surgical coordination system 102 may communicate with clinic practice management 104, electronic medical records 106, or another medical management system to determine whether a patient consent has been entered (e.g., uploaded) into the medical management system. When a consent has been entered into the medical management system for a surgical case, the surgical coordination system 102 may update the workflow state of the surgical case accordingly.

The surgical coordination system 102 may communicate with additional systems, such as an operational note system as described in Patent Application No. 63/250,841, entitled "Generation and Transmission of Operational Notes," which is hereby incorporated in its entirety. For example, the surgical coordination system 102 may provide status information about surgical cases to the operative note system and may update an operative note workflow item based on generation of the operative note using the operative note system.

The surgical coordination system 102 may be generally implemented by a computing device or combinations of computing resources in various embodiments. In various examples, the surgical coordination system 102 may be implemented by one or more servers, cloud computing resources, and/or other computing devices. The surgical coordination system 102 may, for example, utilize various processing resources to update workflow items, generate initial workflows for cases, communicate with medical management systems, and the like. The surgical coordination system 102 may further include memory and/or storage locations to store program instructions for execution by the processor and various data utilized by the surgical coordination system. In some embodiments, the surgical coordination system 102 may utilize storage to provide record storage for a surgical center.

Clinic practice management 104, electronic medical records 106, and surgical center practice management 108 may similarly be implemented by one or more computing devices or combinations of computing resources in various embodiments. Each of clinic practice management 104, electronic medical records 106, and surgical center practice management 108 may be medical management systems utilized by a clinic, surgical center, provider group, insurance company, or other organization for management of various tasks such as scheduling, maintaining patient medical records, and the like. Such medical management systems may communicate with various entities using the network 110.

The network 110 may be implemented using one or more of various systems and protocols for communications between computing devices. In various embodiments, the network 110 or various portions of the network 110 may be implemented using the Internet, a local area network (LAN), a wide area network (LAN), a wide area network (WAN), and/or other networks. In addition to traditional data networking protocols, in some embodiments, data may be communicated according to protocols and/or standards including near field communication (NFC), Bluetooth, cellular connections, and the like.

In various examples, the surgical center device 114 and the clinic device 112 may have access to one or more medical management systems (e.g., clinic practice management 104, electronic medical records 106, surgery center practice management 108, and the like) and/or the surgical coordination system 102. For example, the clinic device 112 may communicate with clinic practice management 104 to schedule a procedure and clinic practice management 104 may communicate the request to the surgical coordination system 102. The surgical coordination system 102 may then establish a new surgical case corresponding to the request and may provide information about the case and/or a request to create an appointment corresponding to the case to the surgery center practice management 108.

Generally, the user devices 116 may be devices belonging to an end user, such as a provider, medical practice manager, or other entities or users accessing the surgical coordination system 102. In some implementations, many user devices 116 may be provided with access to the surgical coordination system 102 and may access the surgical coordination system 102 to view surgical cases scheduled at multiple surgical centers. For example, a user device 116 belonging to a physician may be provided with access to the surgical coordination system 102 to view surgical schedules at multiple surgery centers. Further, user devices 116 may be assigned to various user groups with varying permissions with respect to viewing and/or updating surgical cases within the surgical coordination system 102. For example, an administrative user device 116 may be granted permissions to update workflow status for surgical cases and to view surgical case notes. The administrative user device 116 may be provided with read-only or similar restricted permissions to surgical case notes within the surgical coordination system 102 such that an administrative user cannot, for example, modify operation notes or provider notes. A provider or physician user device 116 may be granted permissions to view and update case notes for surgical cases associated with the provider's identifier. In various embodiments, the user devices 116 may be authenticated by an authentication service prior to accessing the surgical coordination system 102.

In various implementations, the user device 116, the clinic device 112, the surgical center device 114 and/or additional user devices may be implemented using any number of computing devices including, but not limited to, a computer, a laptop, tablet, mobile phone, smart phone, wearable device (e.g., AR/VR headset, smart watch, smart glasses, or the like), smart speaker, vehicle (e.g., automobile), or appliance. Generally, the user devices may include one or more processors, such as a central processing unit (CPU) and/or graphics processing unit (GPU). The user devices may generally perform operations by executing executable instructions (e.g., software) using the processor(s).

Components of the surgical coordination system 102 and in communication with the surgical coordination system 102 shown in FIG. 1 are exemplary and may vary in some embodiments. For example, in some embodiments, the surgical coordination system 102 may be distributed across multiple computing elements, such that components of the surgical coordination system 102 communicate with one another through the network 110. Further, in some embodiments, computing resources dedicated to the surgical coordination system 102 may vary over time based on various factors such as usage of the surgical coordination system 102.

Figure 2:
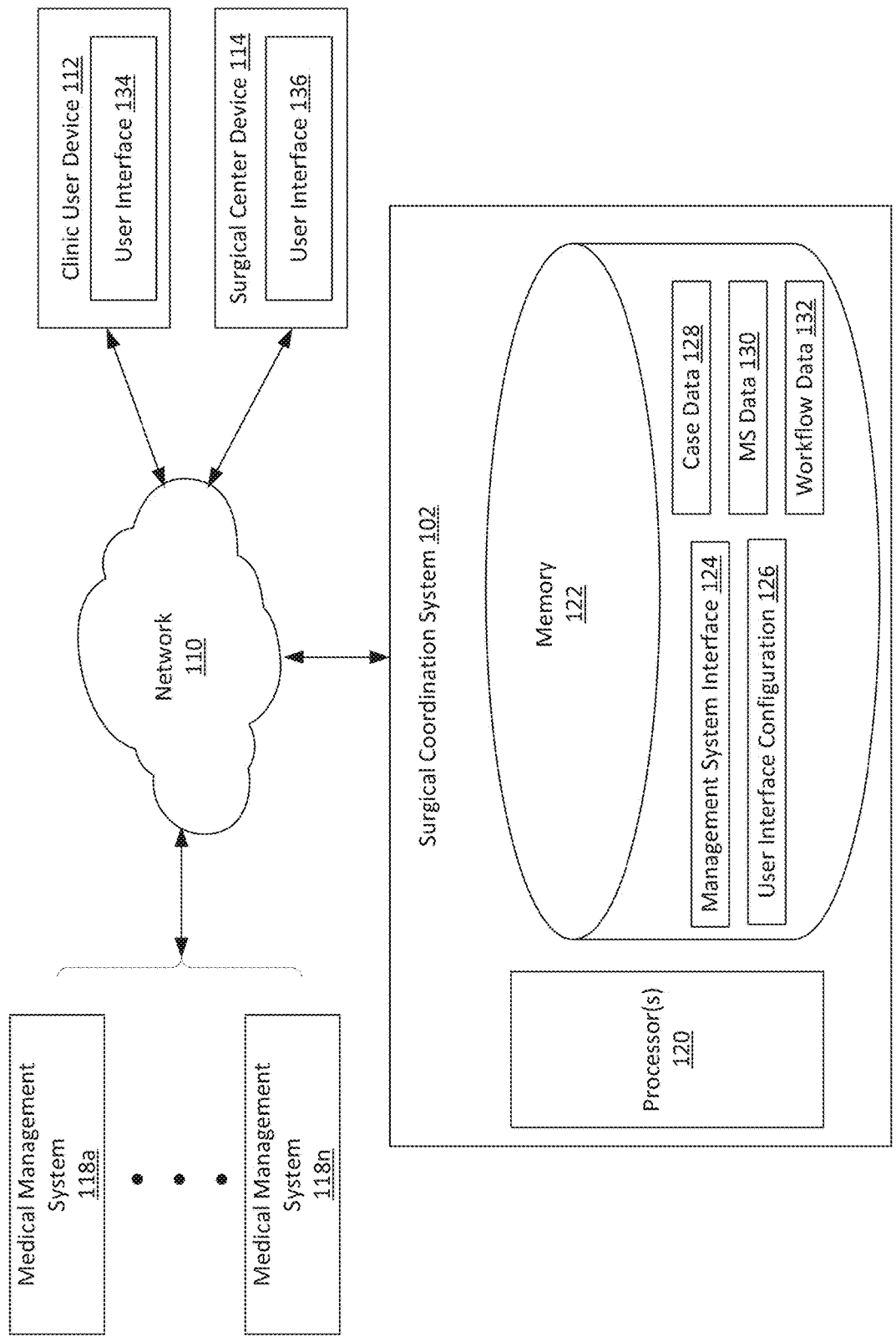
FIG. 2 illustrates an example surgical coordination system in accordance with various embodiments of the disclosure.

FIG. 2 illustrates an example surgical coordination system 102 in accordance with various embodiments of the disclosure. The surgical coordination system 102 may communicate via the network 110 with various medical management systems 118 a-n. User devices, such as the clinic user device 112 and the surgical center device 114 may communicate with the surgical coordination system 102 and/or various medical management systems 118 a-n via the network 110. For example, the clinic device 112 may communicate with a clinic practice management system and the surgical coordination system 102, while the surgical center device 114 may communicate with a surgical practice management system and the surgical coordination system 102. Further, in various embodiments, additional user devices may access the surgical coordination system 102. For example, a clinic device associated with a primary care provider or referring practice may also communicate with the surgical coordination system 102 and/or additional medical management systems in communication with the surgical coordination system 102.

In various implementations, the surgical coordination system 102 may include or utilize one or more hosts or combinations of compute resources, which may be located, for example, at one or more servers, cloud computing platforms, computing clusters, and the like. Generally, the surgical coordination system 102 is implemented by compute resources including hardware for memory 122 and one or more processors 120. For example, the surgical coordination system 102 may utilize or include one or more processors, such as a CPU, GPU, and/or programmable or configurable logic. In some embodiments, various components of the surgical coordination system 102 may be distributed across various computing resources, such that the components of the surgical coordination system 102 communicate with one another through the network 110 or using other communications protocols. For example, in some embodiments, the surgical coordination system 102 may be implemented as a serverless service, where computing resources for various components of the surgical coordination system 102 may be located across various computing environments (e.g., cloud platforms) and may be reallocated dynamically and/or automatically according to, for example, resource usage of the surgical coordination system 102. In various implementations, the surgical coordination system 102 may be implemented using organizational processing constructs such as functions implemented by worker elements allocated with compute resources, containers, virtual machines, and the like.

The memory 122 may include instructions for various functions of the surgical coordination system 102 which, when executed by processor 120, perform various functions of the surgical coordination system 102. The memory 122 may further store data and/or instructions for retrieving data used by the surgical coordination system 102. Similar to the processor 120, memory resources utilized by the surgical coordination system 102 may be distributed across various physical computing devices. In some examples, memory 122 may access instructions and/or data from other devices or locations, and such instructions and/or data may be read into memory 122 to implement the surgical coordination system 102.

In various embodiments, memory 122 may store management system data 130. Management system data 130 may include various information used to query different medical management systems in communication with the surgical coordination system 102. For example, management system data may include schema and fields of the management systems in communication with the surgical coordination system, including, in some examples, mappings of management system fields to fields of case data.

In various embodiments, memory 122 may store workflow data 132. Workflow data 132 may include, in some examples, workflow items, statuses available for workflow items, categorization of workflow items as pre-procedure or post-procedure, identification of "critical" workflow items, instructions regarding how to determine a high level status for a case based on statuses of individual workflow items, and the like. Workflow data 132 may further include, in various examples, different combinations of workflow items for use in different types of cases, permissions for updating workflow items (e.g., users who may change status of workflow items through a workflow interface), and/or mappings of workflow items to fields or other information from various medical management systems.

In some examples, workflow data 132 may include a plurality of workflow items, including instructions for configuring workflow items, determining a state of individual workflow items, order of workflow items, permissions for viewing and/or updating workflow items, and the like. Workflow data 132 may, in some examples, also include instructions for creating a workflow of workflow items based on case type, associated providers, and/or other relevant case data. For example, cases associated with patients carrying certain types of insurance may include additional workflow items for insurance pre-approval, while cases associated with patients carrying other types of insurance may not include workflow items for insurance pre-approval. Similarly, some providers and/or types of cases may include additional workflow items which may be included in workflow data 132 based on certain information in the case data of a case. For example, a case where the patient is receiving general anesthesia may include workflow items for confirming an anesthesiologist, scheduling and completing a patient pre-surgical consultation with the anesthesiologist, and the like.

In some examples, workflow data 132 may include a base set of workflow items for generating a workflow and additional workflow items to add based on case data. For example, a base workflow may include workflow items for facility insurance, provider insurance, consent, history & physical (H&P), confirmation of surgery, surgery, post-op orders, operative note, and billing. The individual items may, in various embodiments, be categorized as pre-surgery and post-surgery and may be displayed in separate groups according to their respective categories. In some embodiments, the individual items may be categorized by the entity responsible for completing the items. For example, items completed through a provider's clinic may be displayed in a first grouping while items completed through a surgery center may be displayed in a second grouping. The workflow data 132 may include instructions for selecting workflow items for a case as well as initializing states for the workflow items in a workflow.

The state of an individual workflow item may include possible states for the workflow item and events and/or additions to case data which may transition a workflow item from one state to another. In some examples, each workflow item may be able to be in a state of not in progress, in progress, additional information needed, urgent attention needed, and complete. The rules for transitions between statuses may be based on multiple factors and/or may be based on user requests to directly update status. For example, a workflow item for confirmation of surgery may be updatable based on requests to update the status and may transition to urgent attention needed if not in a status of complete by a certain time before scheduling of the procedure or surgery. Other workflow items may, in some examples, transition between states based on updated case information. For example, a workflow item corresponding to consent for a procedure may update to complete when a consent document is added to a medical management system 118a-118n.

In some embodiments, the state of individual workflow items may further include restrictions on updating the state of the individual workflow items based on the state of other workflow items in the workflow. For example, a workflow item for an operative note may be unable to be updated until the workflow item for surgery is complete. In some embodiments, post procedure workflow items may be restricted from updating until all pre-procedure items are complete and/or the workflow item for surgery has a state of complete. In some embodiments, the state of individual workflow items may further include restrictions on updating the state of the individual workflow items based on an overall status of the surgical case. For example, where a case has not yet been accepted by a surgical center, updates to items completed by the surgical center may be restricted. Updates to individual workflow items may also be restricted based on an affiliation of a user accessing the surgical coordination system 102. For example, a user associated with a provider clinic may be restricted from updating states for workflow items categorized as the responsibility of the surgical center. In such examples, each user of the surgical coordination system 102 may be associated with a user profile. A user profile may store various information about a user such as an associated organization, user type, permissions, and the like. The user's permissions may be configured such that the user is not able to update specific types of workflow items. Alternatively or additionally, workflow items may be associated with a particular organization (e.g., a surgical center), and a user not associated with the same organization may be prevent from updating such workflow items.

In some examples, the surgical coordination system 102 may provide interfaces for direct update of case data (e.g., adding case data through the surgical coordination system 102) and workflow items may update based on such updates. For example, the surgical coordination system 102 may allow for entry of post-op orders or operative notes via an interface to the surgical coordination system 102. In addition to communicating entered notes to relevant medical management systems, workflow items corresponding to post-op orders, for example, may update to complete when post-op orders are entered into the surgical coordination system 102 and are signed by a physician.

In various embodiments, memory 122 may store case data 128. Case data 128 may include, in various examples, patient data, provider data, case data, appointment data, and the like. In various embodiments, case data may be stored statically at a storage location associated with the surgical coordination system 102 or may be accessed from other locations (e.g., via a query to an EMR) as needed. Some case data may be stored statically and some may be accessed dynamically in various embodiments.

Case data 128 may be organized and stored using various elements or objects, interrelations between objects, data structures, and the like. In one example, case data 128 may be organized according to surgical cases. A surgical case may be associated with various identifiers, such as a patient identifier, a provider identifier, and/or a practice identifier, linking the surgical case to a particular patient, provider, and provider practice, respectively, within the surgical coordination system. The surgical case may further have a workflow state reflecting the status of various workflow items associated with the surgical case. In various examples, a surgical case may be associated with other objects or events, such as appointments for the patient classified as part of the case. A surgical case may also hold information specific to the case such as diagnostic codes, type of anesthesia used during a procedure, an indicator of precedence or urgency (e.g., a period of time during which a case should be scheduled or should take precedence over other procedures), implants or other materials used during the procedure, and the like. For example, a database entry for a surgical case may include fields or references to other elements representing such other information specific to the case.

A surgical case may, for example, be associated with a patient identifier referencing a patient. The patient identifier may be a patient identifier used by, for example, a medical management system (e.g., a medical record number). The patient may be referenced in multiple cases. A patient object or structure may store information or instructions for dynamically obtaining information about the patient such as appointments for the patient, medical information about the patient (e.g., medical history, medications and doses, referring physicians, allergies, and the like), biographical information about the patient (e.g., address, contact information, date of birth, insurance carrier, emergency contacts, and the like), and other data regarding the patient. In various embodiments, some or all of the data included with the patient may be retrieved from a medical management system (e.g., an EMR). The patient data may be retrieved when a new patient is created within the surgical coordination system 102 and may, in some examples, be updated responsive to updates at the medical management system. For example, where a new allergy is added to patient's electronic medical record, the surgical coordination system 102 may update a corresponding field in the surgical coordination system 102.

A surgical case may be associated with a provider identifier referencing a provider within the surgical coordination system 102. The provider identifier may, in various examples, be associated with each case and appointment to which a provider is assigned. The provider identifier may belong to any type of provider associated with a particular case, including, for example, a surgeon performing a procedure, an anesthesiologist, nurses, other providers involved in consultation and/or follow-up visits, and the like. In various embodiments, a provider may be an object or structure including several fields storing information about a provider, such as, for example, contact information, affiliations, medical management systems used by the provider, and the like.

A surgical case may be associated with a practice identifier referencing a practice group with which a provider is associated within the surgical workflow coordination system 102. Providers may, in some examples, be associated with multiple practices, and so each case may be associated with a practice via a practice identifier. The practice identifier may be used to query the proper medical management system (e.g., electronic medical records 106) corresponding to the practice and/or to generate user interfaces displaying all cases for a particular practice. Such interfaces may be used, for example, by schedulers or other administrative users working on behalf of a particular practice group.

A surgical case may include a workflow state. The workflow state may store, for example, a status of each item in a workflow for the case. The workflow state may be initially configured based on workflow data 132 and the workflow state may include the state of each item in the workflow. The workflow state may further include a high-level or overall state or status of the workflow, which may be determined based on the statuses or states of individual workflow items and/or other case data. The definitions of a high-level or overall state may be defined by the workflow data 132 and/or may be defined in the case data 128 for an individual case. For example, workflow data 132 may define a high-level state of "needs urgent attention" for a workflow when any individual workflow item has a status of "needs urgent attention."

A surgical case may further be associated with one or multiple appointments. Appointments may have additional associated information such as, in various examples, an associated patient identifier, an associated provider identifier, a location, a scheduled time and date, and the like. In some examples, appointments may further be associated with an appointment type, such as a consultation, surgery or procedure, or follow-up visit. Various information for appointments may be obtained from medical management systems, including, for example, clinic practice management and/or surgical center practice management. For example, when an appointment is created or scheduled using a clinic practice management system, information about the appointment may be obtained from the clinic practice management system by the surgical coordination system 102.

The surgical case structure described above is exemplary and may be modified in various examples. For example, in some examples, a surgical case may be associated with additional identifiers based on, for example, procedures of the surgical center using the surgical coordination system 102, types of procedures, and the like. For example, a surgical case may be associated with several provider identifiers to reflect additional providers involved in the surgical case. In some examples, a surgical case may further be associated with an insurance identifier, a financially responsible party identifier, a referring physician identifier, and/or additional fields.

In various embodiments, the memory 122 may include instructions implementing a management system interface 124 when executed by the processor 120. The management system interface 124 may utilize case data 128, management system data 130, and/or workflow data 132 to communicate with medical management systems 118*a-n*. The management system interface 124 may further update case data 128 based on information received from various medical management systems 118*a-n*. For example, the management system interface 124 may receive a request for a new surgical case from a medical management system 118*a* and may update case data 128 to create the new case and/or a new patient, provider, and/or appointment associated with the new case. The management system interface 124 may determine which additional information to obtain from other medical management systems to complete case data 128 corresponding to a case. Accordingly, the management system interface 124 may access management system data 130 to generate one or more queries to medical management systems 118*a-n*. In some examples, the management system interface 124 may further include functionality for providing new information to medical management systems 118*a-n*, authenticating users accessing the surgical coordination system 102 through a medical management system, and/or other types of functionality relating to communication between the surgical coordination system 120 and medical management systems 118*a-n*.

The memory 122 may include instructions implementing user interface configuration 126 when executed by the processor 120. User interface configuration 126 may be configured to access case data 128, medical management system data 130, and/or workflow data 132 to generate user interfaces to the surgical coordination system 102. User interface configuration 126 may also, in various examples, update case data 128, management system data 130, and/or workflow data 132 based on information provided to the surgical coordination system 102 via a user interface. For example, user interface configuration 126 may update a workflow state for a case stored as case data 128 responsive to a user request to update status of a workflow item. User interface configuration 126 may also, in various examples, communicate with management system interface 124 to provide information to, or receive information from, medical management systems 118*a-n*. For example, user interface configuration 126 may receive login credentials for a user of the surgical coordination system 102 through a user interface 134 at a clinic user device 112. The user interface configuration 126 may then communicate with the management system interface 142 to authenticate the credentials with a medical management system before generating the requested user interface.

Figure 3:
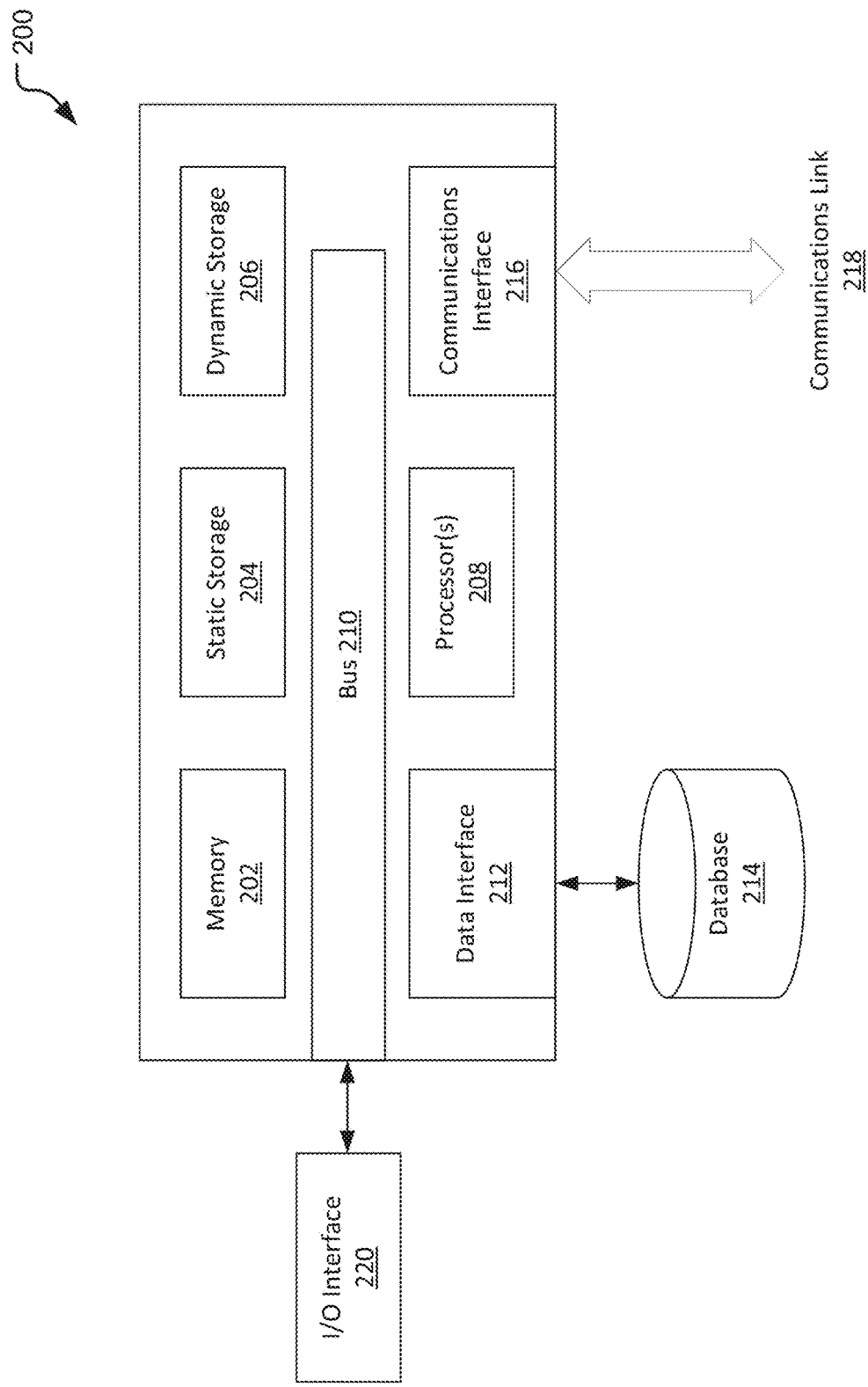
FIG. 3 is a schematic diagram of an example computer system implementing various embodiments in the examples described herein.

The surgical coordination system 102 may be implemented using various computing systems. Turning to FIG. 3, an example computing system 200 may be used for implementing various embodiments in the examples described herein. For example, processor 120 and memory 122 may be located at one or several computing systems 200. In various embodiments, user device 116 is also implemented by a computing system 200. Various medical management systems, such as clinic practice management 104, electronic medical records 106, and surgery center practice management 108 may also be implemented by one or several computing systems 200. This disclosure contemplates any suitable number of computing systems 200. For example, the a computing system 200 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 200 may include one or more computing systems; be unitary or distributed; span multiple locations; span multiple locations; span multiple machines; span multiple data centers; or reside in a cloud, which may include one or more cloud components in one or more networks.

Computing system 200 includes a bus 210 (e.g., an address bus and a data bus) or other communication mechanism for communicating information, which interconnects subsystems and devices, such as processor 208, memory 202 (e.g., RAM), static storage 204 (e.g., ROM), dynamic storage 206 (e.g., magnetic or optical), communications interface 216 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 220 (e.g., keyboard, keypad, mouse, microphone). In particular embodiments, the computing system 200 may include one or more of any such components.

In particular embodiments, processor 208 includes hardware for executing instructions, such as those making up a computer program. The processor 208 circuitry includes circuitry for performing various processing functions, such as executing specific software for perform specific calculations or tasks. In particular embodiments, I/O interface 220 includes hardware, software, or both, providing one or more interfaces for communication between computing system 200 and one or more I/O devices. Computing system 200 may include one or more of these I/O devices, where appropriate. One or more of these I/O devices may enable communication between a person and computing system 200.

In particular embodiments, communications interface 216 includes hardware, software, or both providing one or more interfaces for communication (such as, for example, packet-based communication) between computing system 200 and one or more other computer systems or one or more networks. One or more memory buses (which may each include an address bus and a data bus) may couple processor 208 to memory 202. Bus 210 may include one or more memory buses, as described below. In particular embodiments, one or more memory management units (MMUs) reside between processor 208 and memory 202 and facilitate accesses to memory 202 requested by processor 208. In particular embodiments, bus 210 includes hardware, software, or both coupling components of computing system 200 to each other.

According to particular embodiments, computing system 200 performs specific operations by processor 208 executing one or more sequences of one or more instructions contained in memory 202. For example, instructions for the management system interface 124 and user interface configuration 126 may be contained in memory 202 and may be executed by the processor 208. Such instructions may be read into memory 202 from another computer readable/usable medium, such as static storage 204 or dynamic storage 206. In alternative embodiments, hard-wired circuitry may be used in place of or in combination with software instructions. Thus, particular embodiments are not limited to any specific combination of hardware circuitry and/or software. In various embodiments, the term "logic" means any combination of software or hardware that is used to implement all or part of particular embodiments disclosed herein.

The term "computer readable medium" or "computer usable medium" as used herein refers to any medium that participates in providing instructions to processor 208 for execution. Such a medium may take many forms, including but not limited to, nonvolatile media and volatile media. Non-volatile media includes, for example, optical or magnetic disks, such as static storage 204 or dynamic storage 206. Volatile media includes dynamic memory, such as memory 202.

Computing system 200 may transmit and receive messages, data, and instructions, including program, e.g., application code, through communications link 218 and communications interface 216. Received program code may be executed by processor 208 as it is received, and/or stored in static storage 204 or dynamic storage 206, or other storage for later execution. A database 214 may be used to store data accessible by the computing system 200 by way of data interface 212. For example, case data 128, medical management system data 130, and/or workflow data 132 may each be stored using a database 214. In various examples, communications link 218 may communicate with, for example, user devices to display user interfaces to the surgical coordination system 102.

Figure 4:
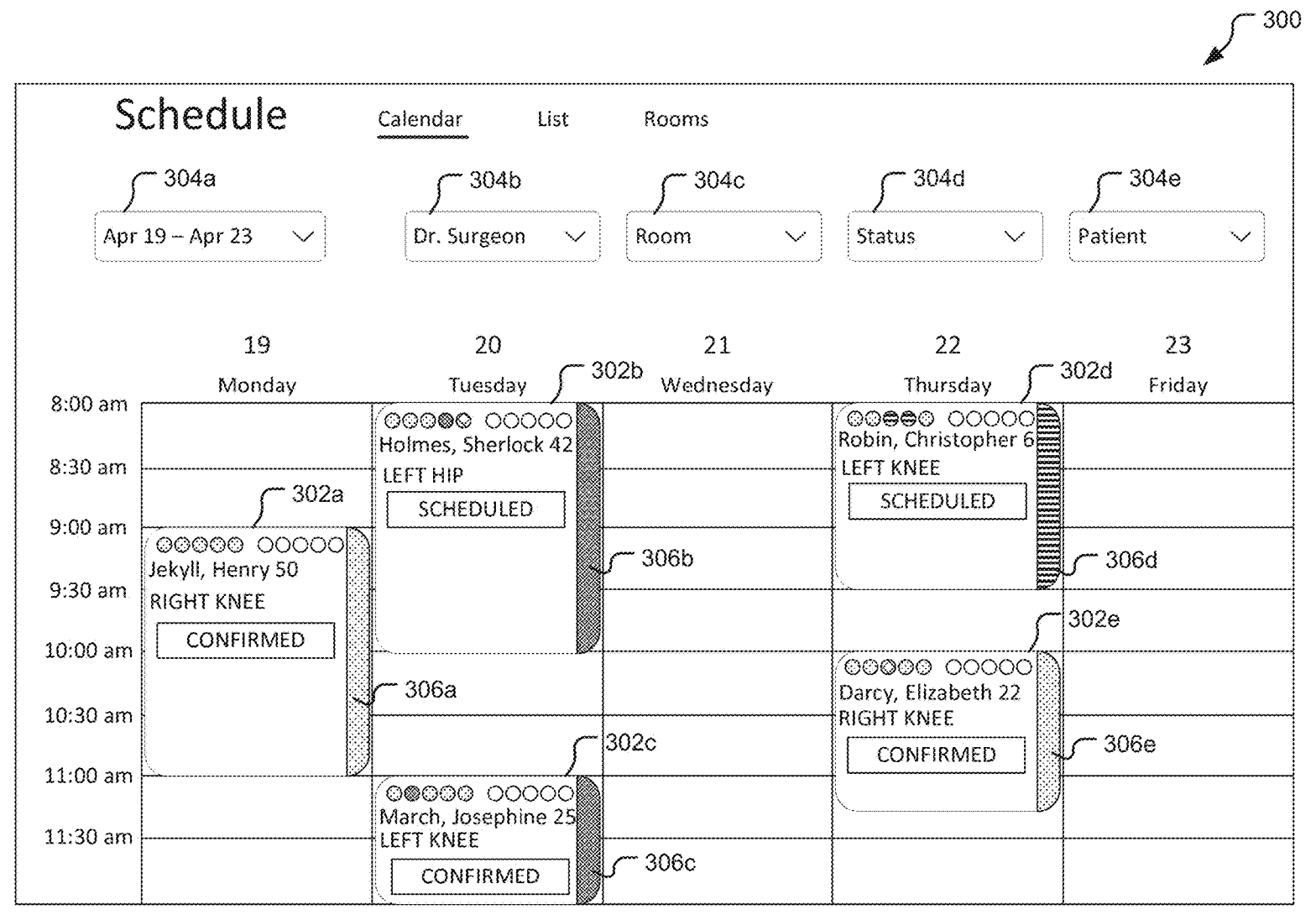

FIG. 4 illustrates an example user interface 300 displaying surgical case data associated with a provider identifier and a temporal identifier, in accordance with various embodiments of the disclosure. The user interface 300 may, in various examples, be configured by user interface configuration 126 for display at a user device. For example the user interface 300 may be presented as the user interface 134 at the clinic user device 112 and/or as the user interface 136 and the surgical center device 114. In various examples, the user interface 300 may be further presented to other user devices 116 and may be displayed differently based on, for example, the type of user device (e.g., mobile device or desktop computer) viewing the user interface 300.

The user interface 300 displays case views 302a-302e corresponding to cases associated with a provider identifier (e.g., procedures performed by Dr. Surgeon) and a temporal identifier (e.g., cases with appointments scheduled during the week of April $19^{th}$-April $23^{rd}$). The provider identifier and the temporal identifier may be obtained through a user interface to the surgical coordination system 102 prior to generation of the user interface 300. For example, dropdown menus 304a-304e may be configured by a user to choose identifiers filtering cases displayed at the user interface 300. In the example user interface 300, a temporal identifier is selected by selecting the week of April $19^{th}$-April $23^{rd}$ from the menu 304a and a provider identifier is selected by selecting Dr. Surgeon from the menu 304b. With the temporal and provider identifiers selected, the user interface 300 shows case views 302a-302e for cases associated with Dr. Surgeon with appointments scheduled during the week of April $19^{th}$-April $23^{rd}$. Options from additional menus 304c, 304d, and/or 304e may also be selected to further define which cases to view. For example, a user could select, using menu 304d, a status of "Scheduled" to view cases for Dr. Surgeon in the week of April $19^{th}$-April $23^{rd}$ that have been scheduled but not yet confirmed by the surgical center. Further, in some examples, a user may select more than one option from one or more of the menus 304a-304e.

The user interface 300 is shown as a calendar view. Case views for cases associated with the same identifiers may be presented in different views, such as a list view or organized, for example, by room, location, patient, or other characteristic. In some embodiments, user interface configuration 126 may be configured to generate case views differently depending on the view selected by the user. For example, the user may select (e.g., using a touch screen, mouse, or other method of selection) an option to select a desired case view.

The case views 302a-302e each display a portion of the case data relating to the case. For example, view 302a displays the patient name and age, a descriptor of the case, and a case stage. In various examples, case views may display additional or other case data depending upon, for example, user settings, selected identifiers, and space constraints. For example, an administrative user may select to display date of birth with the case views to quickly verify date of birth when speaking with patients or providers. In some examples, where a provider identifier is not selected to generate the user interface 300, the case views may display a primary provider associated with the case. Other case data, such as location, additional providers, primary contact (e.g., for pediatric patients), patient contact information, and the like may be displayed in the case view in various examples. The case data displayed in the case view may, in some examples, vary based on a size or configuration of the case view within the user interface 300. For example, a case taking only 30 min on the schedule displayed in the user interface 300 may have less space to display information and may include only patient name and age. In some examples, the case data may be reduced where the user interface 300 is being viewed with a mobile device. Which portions of case data are displayed for different sizes and configurations of case views may be updated through user settings individually and/or across an organization (e.g., a practice or group of providers, a surgical center, and the like).

The case views 302a-302e display status indicators relating to the workflow state for the case. For example, each of the circles displayed at the top of the case views 302a-302e may be associated with a workflow item of the workflow and may be displayed in the user interface 300 according to the status of the associated workflow item. For example, the color (or pattern, as shown in the user interface 300) of a status element may be chosen based on the status of the workflow item. For example, a completed item may be shown as a green circle, an in-progress item may be shown as a yellow circle, an item where additional action is needed may be shown as an orange circle, and a critical item may be shown as a red circle. In some embodiments, status indicators that are not applicable to a certain case or not eligible to be completed (e.g., operation notes for a procedure that has not yet occurred), may be shown in another color (e.g., gray or black) and may be unable to be updated prior to a certain time (e.g., the completion of the procedure). In some examples, status indicators which are viewable but not updatable by a certain user (e.g., status indicators which are the responsibility of the surgery center and are not updatable by a user associated with a physician practice group) may further be displayed differently, such as with different shades of color, with different outlines, and/or with different patterns.

The user interface 300 may include functionality for updating the status indicators corresponding to workflow items. For example, some users may have permissions to update a status indicator or element (e.g., by clicking on the status element) to track completion of tasks in the workflow. For example, an administrative user may receive a signed patient consent and, accordingly, update the workflow item from "pending" to "complete." In some examples, the status indicators for workflow items may also update automatically responsive to an updated workflow status for a case from, for example, new documents or information being provided to a medical management system. For example, a medical insurance provider may enter approval for preauthorization of a procedure for the patient in a medical management system used by the insurance provider, updating the status for the patient insurance workflow item in the patient data of the case. A status element corresponding to the patient insurance workflow item in the user interface 300 may then be updated, for example, from a yellow circle to a green circle.

The case views 302a-302e also include high level status elements 306a-306e, shown as patterned bars on one side of the case views 302a-302e. As with the status elements corresponding to workflow elements, the high level status elements 306a-306e may be rendered in a different color, pattern, or other defined way based on the status of the associated case as a whole. For example, the high level status elements 306a-306e may indicate which cases have urgent workflow items (e.g., items which, if not completed, could prevent a procedure from occurring), or workflow items where additional action is required. For example, case view 302d includes a high level status indicator 306d patterned in bold stripes, which may correlate to a case associated with one or more workflow items needing urgent action. Where the user interface 300 is displayed in color, high level status element 306d may be displayed, for example, as red. The status indicators displayed with view 302d correlating to workflow items include two items with the same bold striped pattern. Similarly, case views 302b and 302c each include high level status elements 306b and 306c patterned to indicate a mid-level or needs attention status. This status may indicate that one or more of the status elements correlating to workflow items need additional action prior to the procedure. Where the user interface 300 is displayed in color, high level status elements 306b and 306c may be displayed, for example, as orange. The high level status elements 306a and 306e displayed as part of the case views 302a and 302e may indicate that the case is on track to proceed as scheduled (e.g., no workflow items need additional action or information). Where the user interface 300 is displayed in color, high level status elements 306a and 306e may be displayed, for example, as green.

The differently displayed high level status elements 306a-306e may allow a user viewing the user interface 300 to quickly determine which cases need additional attention. The conditions which correspond to a particular high level status may vary and, in some embodiments, may be customized for an organization, center, provider, or the like. The high level status may be based both on statuses of individual workflow elements and other factors. For example, a high level status element may be displayed to indicate an urgent status when the case has one or more individual workflow elements having an urgent status and/or when the case has two or more individual workflow elements needing attention and less than two weeks until the scheduled procedure. In some examples, the high level status elements 306a-306e may be displayed differently based on an identity and/or affiliation of a user viewing the user interface 300. For example, a user affiliated with a physician practice group may see a high level status for a case with outstanding tasks that are the responsibility of the physician practice group, a user associated or affiliated with a surgical center may see the high level status as on-track or mid-level for the same case. Accordingly, high level status of a surgical case may, in such examples, be determined for a user based on the status of tasks associated with or that are the responsibility of the user or an organization associated with the user.

The status elements shown in the user interface 300 are exemplary and may be varied in some embodiments. For example, high level status elements may be displayed as bolded or color coded words displayed in the case views 302a-302e. In some examples, the high level status indicator may be a background color of the entire case views 302a-302e. Similarly, the status indicators corresponding to workflow items may be varied. For example, the workflow items may be listed in the case views 302a-302e and may vary in color based on the status of the workflow item. In some examples, a subset of workflow items may be displayed at different times. For example, a case where surgery has not yet occurred may display only status indicators for pre-procedure workflow items. Similarly, a case where surgery has concluded may display status indicators for post-procedure workflow items.

In some examples, various functionality of the user interface 300 and/or information presented to a user via the user interface 300 may vary based on the identity of a user, the type of user, or other factors that may affect permissions granted to users. For example, options available through the menus 304a-304e may vary for individual users based on permissions granted to the users when access is granted to the surgical coordination system 102. For example, an administrative user who schedules patients for two specific providers may be able to select only one or both of those providers from the menu 304b. In some examples, users may be able to update workflow item status when given permission to update workflow items for a case. Such permission may be granted wholesale (e.g., an administrative user may be able to update workflow items for any surgical case), granted partially (e.g., a user may update workflow items only for cases associated with a subgroup of providers), or denied.

Figure 5:
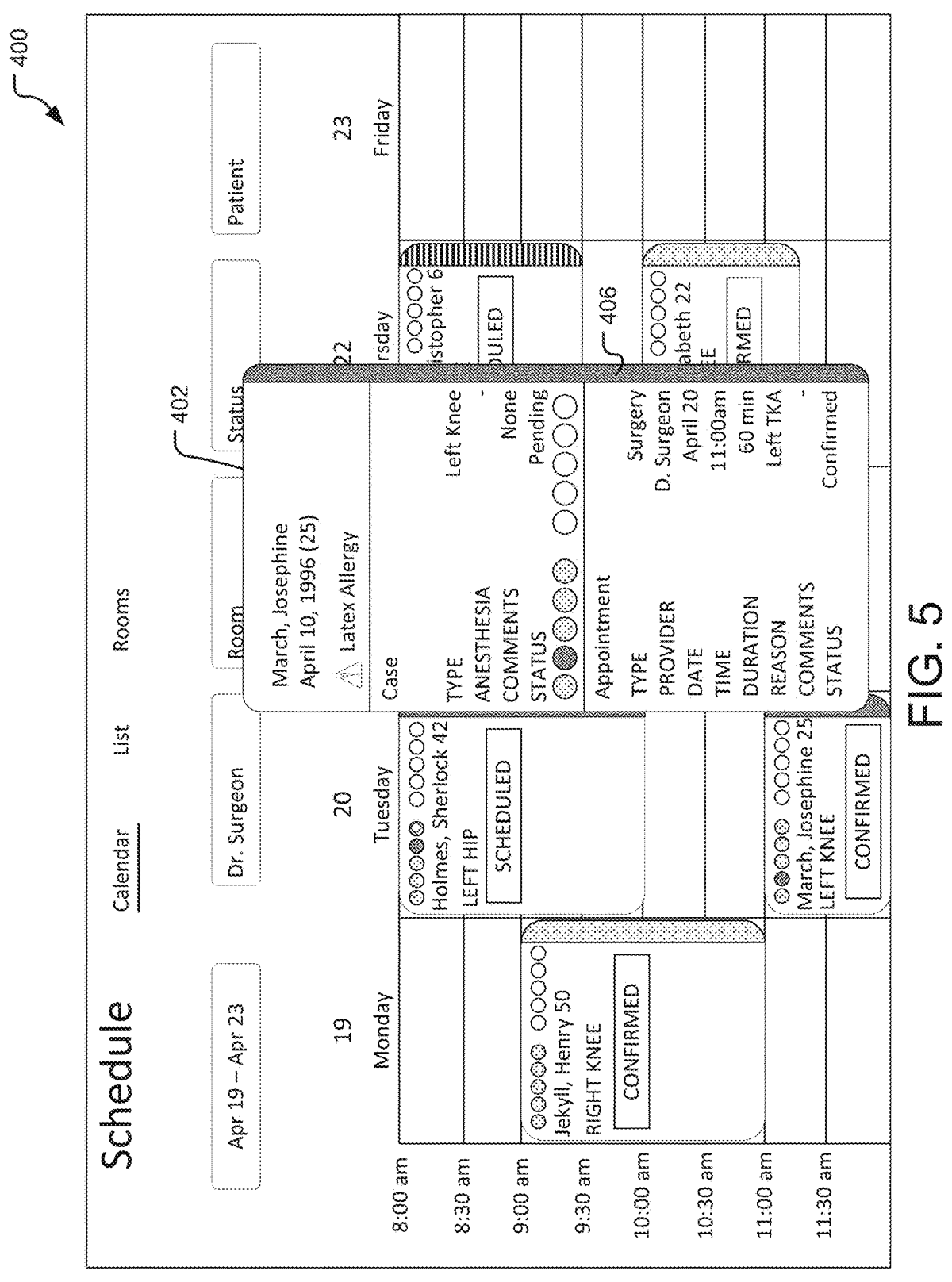

In some examples, the user interface 300 may provide user interactions to view more or different case data, individual workflow items, or the like. For example, FIG. 5 illustrates an example user interface 400 displaying surgical case data, generated by user interaction with the user interface 300. The user interface 400 shows additional surgical case data for the case associated with case view 302c. This additional surgical case data may be displayed as a detailed case view 402. The detailed case view 402 may be displayed responsive to user interaction with the case view 302c, such as hovering over the case view 302c with a cursor, selecting (e.g., by clicking with a mouse or other pointer or touching using a touch screen) the case view 302c, or other defined action. In some examples, the case view 402 may include functionality for viewing additional information or case data through various user interactions. For example, hovering over, clicking, or otherwise selecting a status indicator associated with a workflow item may display additional information about the item, such as the name of the item, the status, and/or comments (e.g., recent actions taken with respect to a particular workflow item). Like the case view 302c, which portions or types of case data are displayed in the detailed case view 402 may be configured by a user on behalf of an organization, class or type of user, or a single user. For example, case data displayed in the detailed case view 402 may vary based on roles of various users.

FIG. 6 illustrates an example user interface 500 displaying surgical case data associated with a provider identifier and a temporal identifier, in accordance with various embodiments of the disclosure. Like the user interface 300, the user interface 500 may, in various examples, be configured by user interface configuration 126 for display at a user device. For example the user interface 500 may be presented as the user interface 134 at the clinic user device 112 and/or as the user interface 136 and the surgical center device 114. In various examples, the user interface 500 may be further presented to other user devices 116 and may be displayed differently based on, for example, the type of user device (e.g., mobile device or desktop computer) viewing the user interface 500. Case views, status indicators, drop down menus, and other elements of the user interface 500 may be implemented by corresponding elements described with respect to the user interface 300.

The user interface 500 displays case views 502*a* and 502*b* corresponding to cases associated with a provider identifier (e.g., procedures performed by Dr. Surgeon) and a temporal identifier (e.g., cases with appointments scheduled on April $20^{th}$). As described with respect to the user interface 300, the provider identifier and the temporal identifier may be obtained through a user interface to the surgical coordination system 102 prior to generation of the user interface 500. The case views 502*a* and 502*b* may display a portion of the case data corresponding to the cases, and which case data is displayed may be determined by a user and/or by settings of the surgical coordination system 102. The user interface 500 may provide functionality for viewing additional case data and/or updating case by user interaction with various elements of the case views 502*a* and 502*b*. For example, the user interface 500 may be configured to display additional information about the status indicators corresponding to the workflow items responsive to selection or other defined user interactions with the status indicators.

Figure 7:
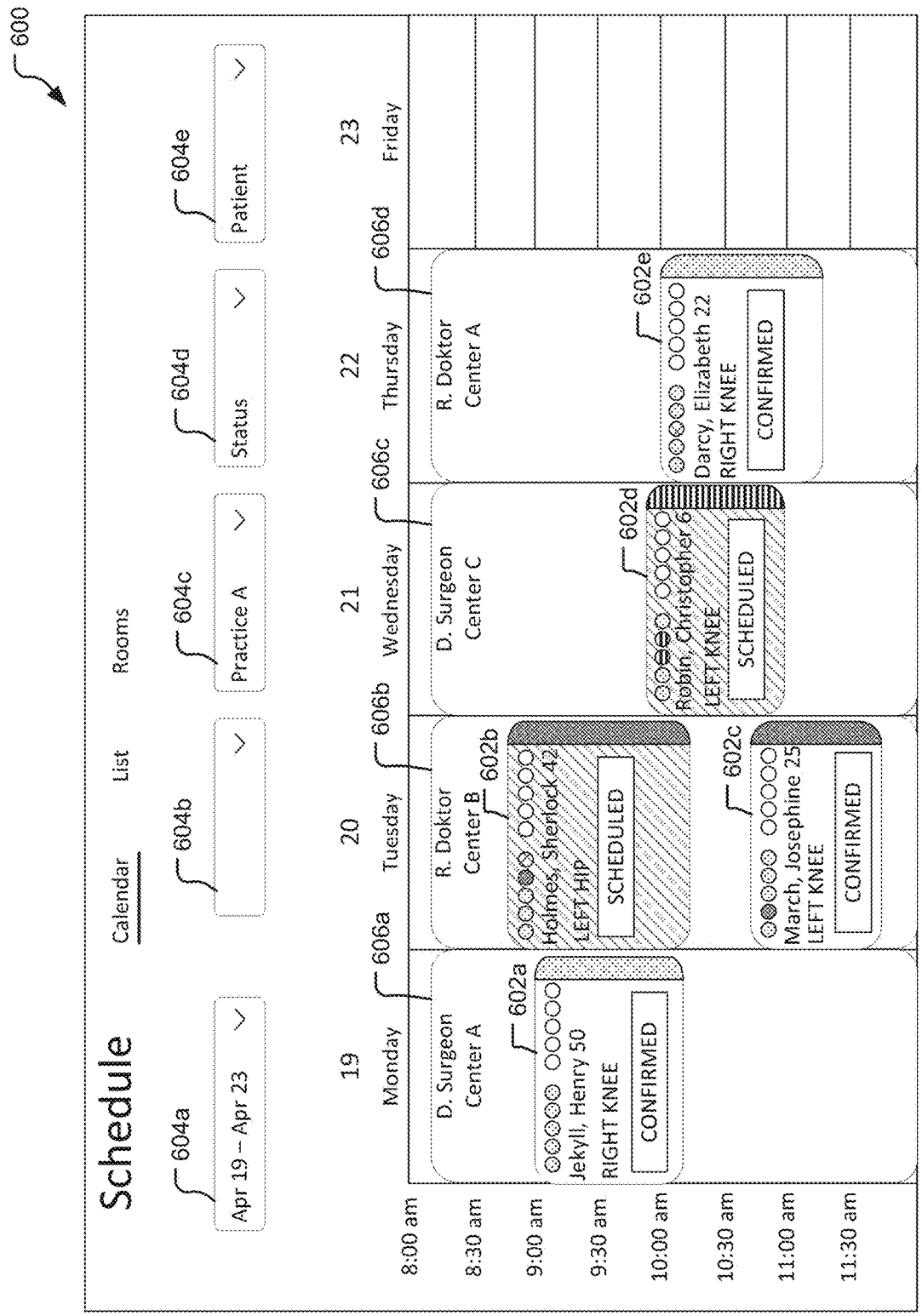
FIG. 7 illustrates an example user interface displaying surgical case data associated with a practice identifier, in accordance with various embodiments of the disclosure.

FIG. 7 illustrates an example user interface 600 displaying surgical case data associated with a practice identifier. Like the user interface 300, the user interface 600 may, in various examples, be configured by user interface configuration for display at a user device. For example, the user interface 600 may be displayed at the clinic user device 112.

The user interface 600 displays case views 602*a*-602*e* corresponding to cases associated with a practice identifier (e.g., displays procedures for all providers associated with practice A) and a temporal identifier (e.g., cases with appointments scheduled during the week of April $19^{th}$-April $23^{rd}$). In some examples, the practice identifier may be associated with a user login or other credentials used to access the surgical coordination system 102. For example, a user who is a practice administrator logging into the surgical coordination system 102 may be associated with a specific practice identifier. The practice identifier may determine which surgical cases may be viewed via the user interface 600. For example, a user associated with a practice identifier may only be able to view surgical cases associated with and/or assigned to providers categorized and/or associated with the same practice identifier.

When the user views the user interface 600, or other interfaces or information utilizing the practice identifier, the specific practice identifier associated with the user may be utilized by default. In some examples, the practice identifier and/or the temporal identifier may be obtained through a user interface to the surgical coordination system 102 prior to generation of the user interface 600. For example, in the user interface 600, the temporal identifier is selected by selecting the week of April $19^{th}$-April $23^{rd}$ from the menu 604*a*. The practice identifier may similarly be selected from the menu 604*c*. For example, a user may be affiliated with multiple practices and may choose between the practices using menu 604*c*. Options from additional menus 602*b*, 604*d* and 604*e* may also be selected to further define which cases to view. In some examples, the user may select more than one option from one or more of the menus 604*a*-604*e*. The user interface 600 is shown in a calendar view including a week. In other examples, similar information may be viewed in a calendar view spanning a day, selection of days, month, or other period of time. Similar information may also be presented in a list view or using other varying layouts.

The case views 602*a*-602*e* may display the same or similar information about case views discussed herein (e.g., case views 302*a*-302*e*). For example, the case views 602*a*-602*e* may display demographic information of the patient, procedure information, status information (e.g., status indicators relating to the workflow), and the like. The case views 602*a*-602*e* may further be displayed as colors with certain patterns, colors, or other indicators based on status of the appointment. For example, a user associated with a practice may be presented with case views 602*a*-602*e* that are displayed differently based on a status of the associated surgical cases at the surgery center. For example, case view 602*b* and case view 602*d* are shown filled in with diagonal stripes. In other examples, case views may be filled in with different colors, patterns, or other visual indicators of status. For example, green may reflect a case that has been accepted by at scheduled at the surgical center, orange may reflect a case that has been requested for scheduling at a surgical center but has not yet been accepted by the surgical center, and red may reflect a case that has been rejected for scheduling by surgical center. Such filling in may reflect a certain status of the case with the surgery center, such as a case that has been requested to be scheduled at the surgery center but has not yet been accepted and/or confirmed by the surgery center.

The user interface 600 may display additional information relevant to the practice. For example, the user interface 600 includes blocks 606*a*-606*d* reflecting that certain providers in the practice have reserved blocks of time at specific surgery centers. Such information may be useful, for example, for schedulers to easily view where a particular provider has time blocked off on a particular day. For example, a time block may be shown in the user interface 600 by filling in a number of hour blocks in a calendar view with a color and/or pattern associated with a provider for the amount of time included in the block. For example, procedures with a provider with a time block may be automatically scheduled where the provider has available space within the time block. In some examples, blocks 606*a*-606*d* may be patterned, colored, or otherwise filled in to convey additional information. For example, each provider may be associated with a different color block and/or each surgical center may be associated with a different pattern.

In various examples, the user interface 600 may provide functionality for scheduling new procedures and/or appointments with a provider and/or conveying scheduling requests to an associated surgery center. For example, a scheduler may schedule an additional procedure in block 606*d*, and a request to schedule the procedure may be sent automatically to surgery center A (e.g., the surgery center associated with the block 606*d*). In various examples, a request to schedule the procedure may also be sent automatically to the provider associated with the block 606*d*.

Figure 8:
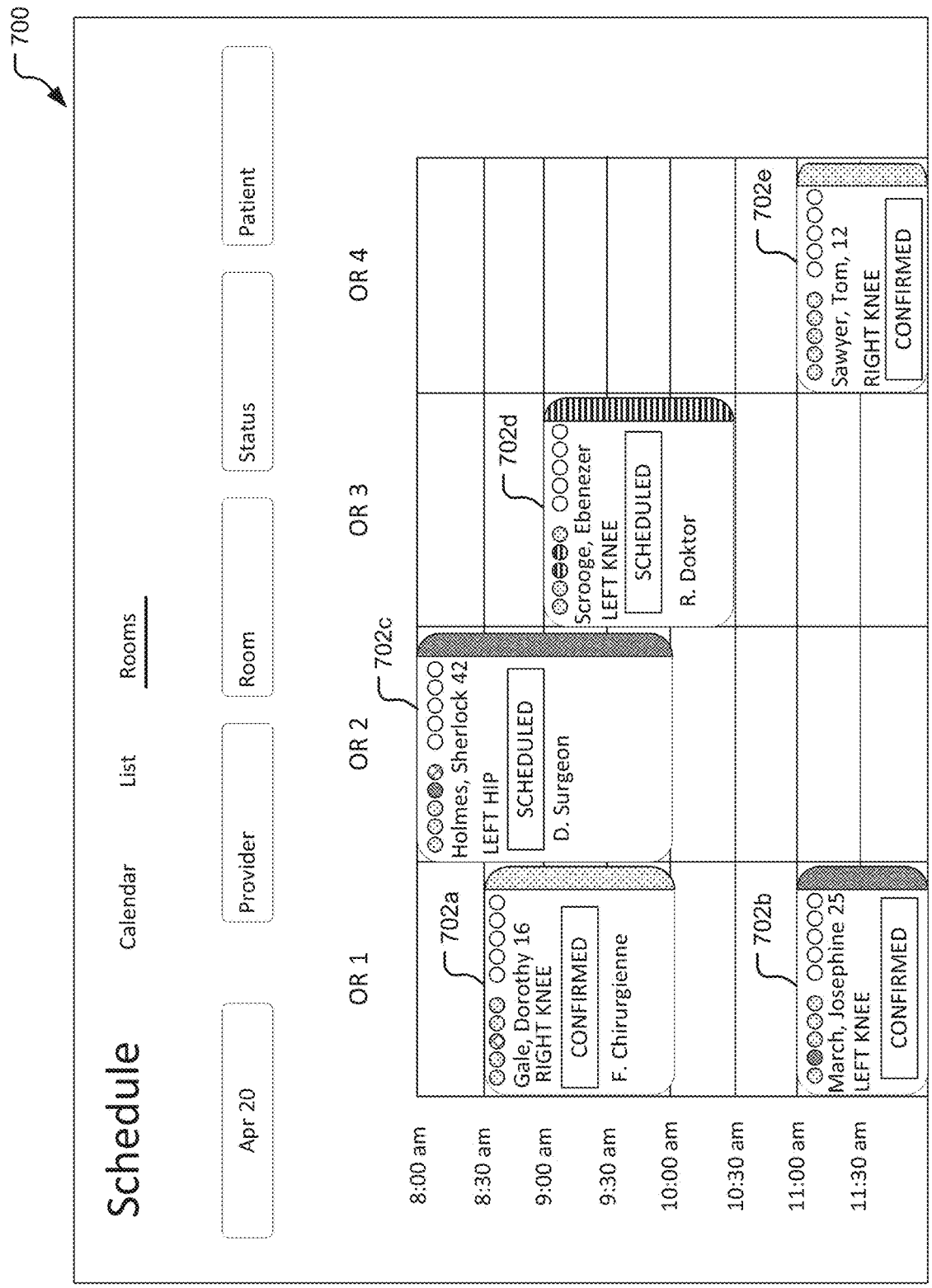
FIG. 8 illustrates an example user interface displaying surgical case data associated with a temporal identifier, in accordance with various embodiments of the disclosure.

FIG. 8 illustrates an example user interface 700 displaying surgical case data associated with a temporal identifier, in accordance with various embodiments of the disclosure. Like the user interface 300, the user interface 700 may, in various examples, be configured by user interface configuration 126 for display at a user device. For example the user interface 700 may be presented as the user interface 134 at the clinic user device 112 and/or as the user interface 136 and the surgical center device 114. In various examples, the user interface 700 may be further presented to other user devices 116 and may be displayed differently based on, for example, the type of user device (e.g., mobile device or desktop computer) viewing the user interface 700.

Case views 702*a-e*, status indicators, drop down menus, and other elements of the user interface 700 may be implemented by corresponding elements described with respect to the user interface 300. The user interface 700 displays case views 702a-702e corresponding to cases associated with a temporal identifier (e.g., cases with appointments scheduled on April 20$^{th}$). Accordingly, the case views 702a-702e may correspond to cases associated with several providers and the associated provider may be displayed with the case views in some situations. For example, case views 702a, 702c, and 702e each display an associated provider while case views 702b and 702e, which are smaller due to appointment length, do not display an associated provider. In some examples, an associated provider and/or other case data may be displayed in a detailed view of the cases, similarly to the detailed view 402. The case views 702a-e are displayed based on which room is booked for the appointment. Such views may be useful, for example, for personnel tasked with preparing operating rooms for particular procedures.

The surgical coordination system 102 may, in various examples, be configured to provide other types of user interfaces allowing for viewing and/or editing of case data of the surgical coordination system 102. For example, additional user interfaces may view cases corresponding with a patient and/or groups of patients, for providers affiliated with a particular clinic, and the like. Additional user interfaces may provide detailed case information relating to one identifier of a case. For example, an interface generated by the surgical coordination system 102 may display all case data associated with a patient, including all associated cases and appointments.

Figure 9:
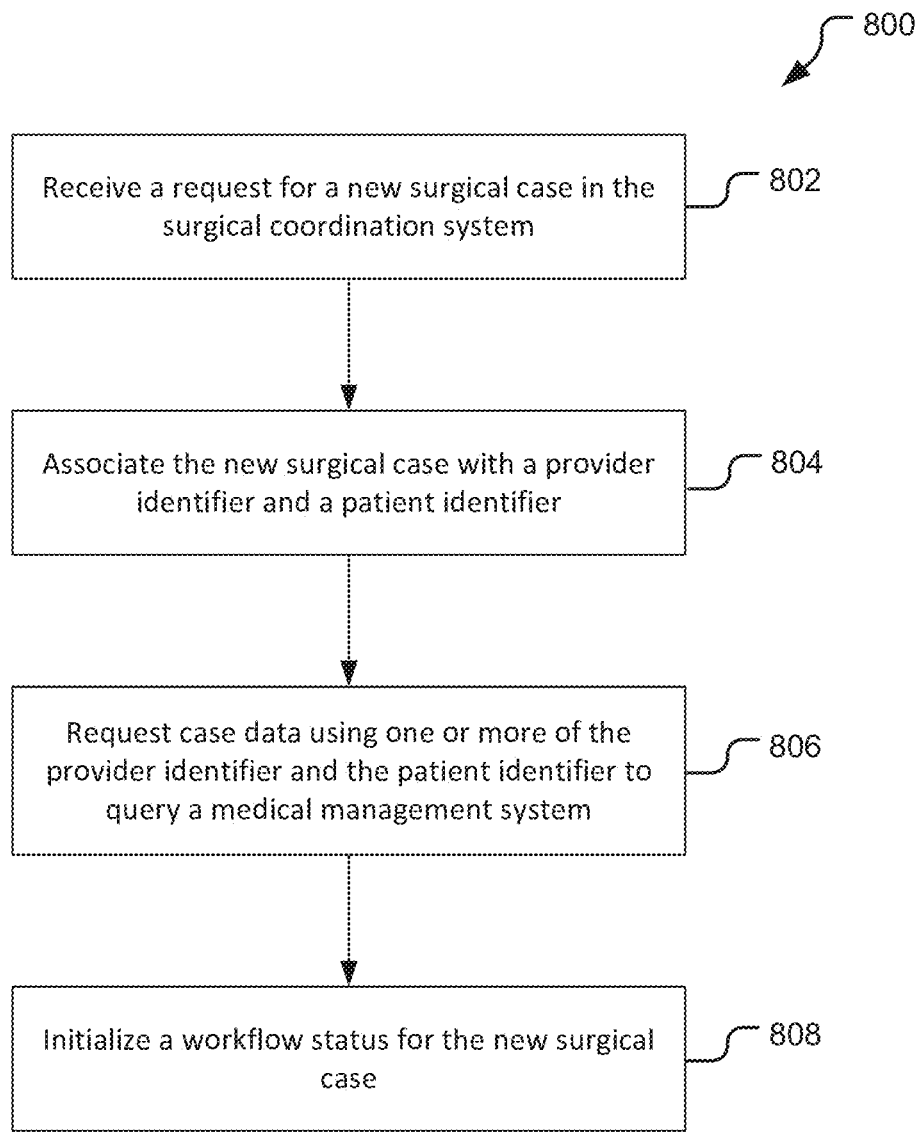
FIG. 9 illustrates an example process for creating a surgical case within a surgical coordination system in accordance with various embodiments of the disclosure.

FIG. 9 illustrates an example process 800 for creating a surgical case within a surgical coordination system in accordance with various embodiments of the disclosure. At block 802, the surgical coordination system 102 receives a request for a new surgical case in the surgical coordination system 102. The request may be received in some examples, by the management system interface 124 from a medical management system in communication with the surgical coordination system 102. For example, the clinic device 112 may communicate with the clinic practice management system 104 to generate a scheduling request for a procedure to be performed by a provider associated with the clinic. In some embodiments, the request for a new surgical case may be received via a user interface to the surgical coordination system 102. In such embodiments, user interface configuration 126 may receive the initial request via the presented user interface and may communicate with the management system interface 124 to further create the new surgical case. In various examples, the request for the new case may include a patient identifier, a provider identifier, a practice identifier, a case type, a requested scheduling time frame, a scheduled time, and/or other information regarding the case.

At block 804, the surgical coordination system 102 associates the new surgical case with a provider identifier and a patient identifier. In some examples, the surgical coordination system 102 may further associate the new surgical case with a practice identifier. Upon receipt of the request for the new surgical case, the management system interface 124, user interface configuration 126, and/or other components of the surgical coordination system 102 may initialize the new case, including associating the surgical case with the provider identifier and patient identifier received with the case request, where applicable. In some examples, the surgical coordination system 102 (e.g., the management system interface 124) may use the associated patient identifier and provider identifier to associate the new case with a patient and/or provider object already established in the surgical coordination system 102. For example, the provider identified by the provider identifier may be already associated with multiple cases in case data 128 of the surgical coordination system 102. The management system interface 124 and/or other components of the surgical coordination system 102 may then update the provider information to reference the newly created case and ensure that the newly created case references the provider. Where the surgical coordination system 102 associates the new surgical case with a practice identifier, the surgical coordination system 102 may further associate the case with a practice group object already established in the surgical coordination system 102.

A similar process may be used to update a patient identified by the patient identifier where the patient has, for example, previously undergone a procedure included in the surgical coordination system 102. Where either a patient identified by the patient identifier or a provider identified by the provider identifier are not already established in the surgical coordination system, block 804 may include creation of new objects and/or structures representing the patient and/or provider within the surgical coordination system 102.

The surgical coordination system 102 requests case data using one or more of the provider identifier, the patient identifier, and the practice identifier to query a medical management system at block 806. The management system interface 124 may, in some examples, determine which information to request based on patient, provider, and/or practice associated with the new surgical case. For example, where a patient was not established in the surgical coordination system 102, the management system interface 124 may request (e.g., via an API call or other query) medical history, biographical information, contact information, and insurance information from a medical management system, such as electronic medical records 106. Where a patient exists in the surgical coordination system 102, the management system interface 124 may request certain fields of information not included in the surgical coordination system 102 and/or may request all patient information to refresh or update stored information about the patient. The management system interface 124 may similarly request additional provider information from one or more medical management systems, such as clinic practice management 104 and/or surgery center practice management 108. The management system interface 124 may identify an applicable medical management system based on the provider identifier and/or the practice identifier.

In various examples, the management system interface 124 may use management system data 130 stored by the surgical coordination system 102 to request information from various management systems. For example, the management system data 130 may include schema, API endpoints, and/or additional information used to form and send queries to medical management systems in communication with the surgical coordination system 102. In some embodiments, case data 128 may also include instructions for obtaining the additional case data. For example, certain fields of the case data 128 may be mapped to certain endpoints of the medical management systems. In some examples, field of the case data 128 may include parameters used by the management system interface 124 to generate queries in accordance with the management system data 130.

In various examples, the management system interface 124 and/or other components of the surgical coordination system 102 may populate additional fields associated with the new surgical case before or after receiving additional patient and/or provider information. Such fields may be filled by queries to medical management systems and/or using information received with the initial request for a new surgical case in the surgical coordination system 102. For example, some requests may include a scheduled initial appointment (e.g., date, time, location of the procedure) and the management system interface 124 may populate an appointment associated with the surgical case based on the initial appointment received with the request. Some requests may not include appointment information and the management system interface 124 may obtain appointment information by querying one or more medical management systems. In some examples, the management system interface 124 may populate some fields (e.g., appointment fields) based on information received from the request and may populate one or more additional fields based on queries to medical management systems.

At block 808, the surgical coordination system 102 initializes a workflow status for the new surgical case. The surgical coordination system 102 may initialize the workflow status based on workflow data 132. For example, workflow data 132 may include instructions for selecting individual workflow items for new surgical cases and establishing initial statuses or states for the individual workflow items in a workflow for a new case. The surgical coordination system 102 may then store states for each of the individual workflow items as, for example, a workflow state associated with the surgical case. In some examples, individual workflow items forming the workflow may be chosen based on the case data associated with the new surgical case. For example, additional workflow items may be included for patients carrying certain types of insurance, providers affiliated with certain organizations, procedures utilizing specialized implants or other surgical tools or equipment, and/or certain types of cases (e.g., pediatric cases). In some examples, all workflow items may initially have a status reflecting that no progress has been made on the workflow item (e.g., not completed or not begun). In some examples, some workflow items may initially have other statuses (e.g., in progress or complete) based on information received with the initial request or with case data corresponding to the new surgical case. For example, a workflow item for provider insurance may have an initial status of complete where case data associated with the provider shows up to date insurance for the procedure being performed.

In some examples, the management system interface 124 may provide the case data (or portions of the case data) for the new case to one or more medical management systems responsive to requests from the systems, instructions included in the request, and/or automatically. For example, the management system interface 124 may provide some case information (e.g., associated provider, location, date, and time) to electronic medical records 104 such that an appointment corresponding to the procedure is viewable through a patient portal to electronic medical records 104. The management system interface 124 may provide the same or different case data to clinic practice management 104 and/or surgery center practice management 108 to establish one or more appointments corresponding to the case in those systems. In some examples, the management system interface 124 may provide confirmation or other status indicators to various medical management systems 118*a-n* responsive to creation of the case (e.g., to indicate that the surgical case was successfully entered into the surgical coordination system 102.

Figure 10:
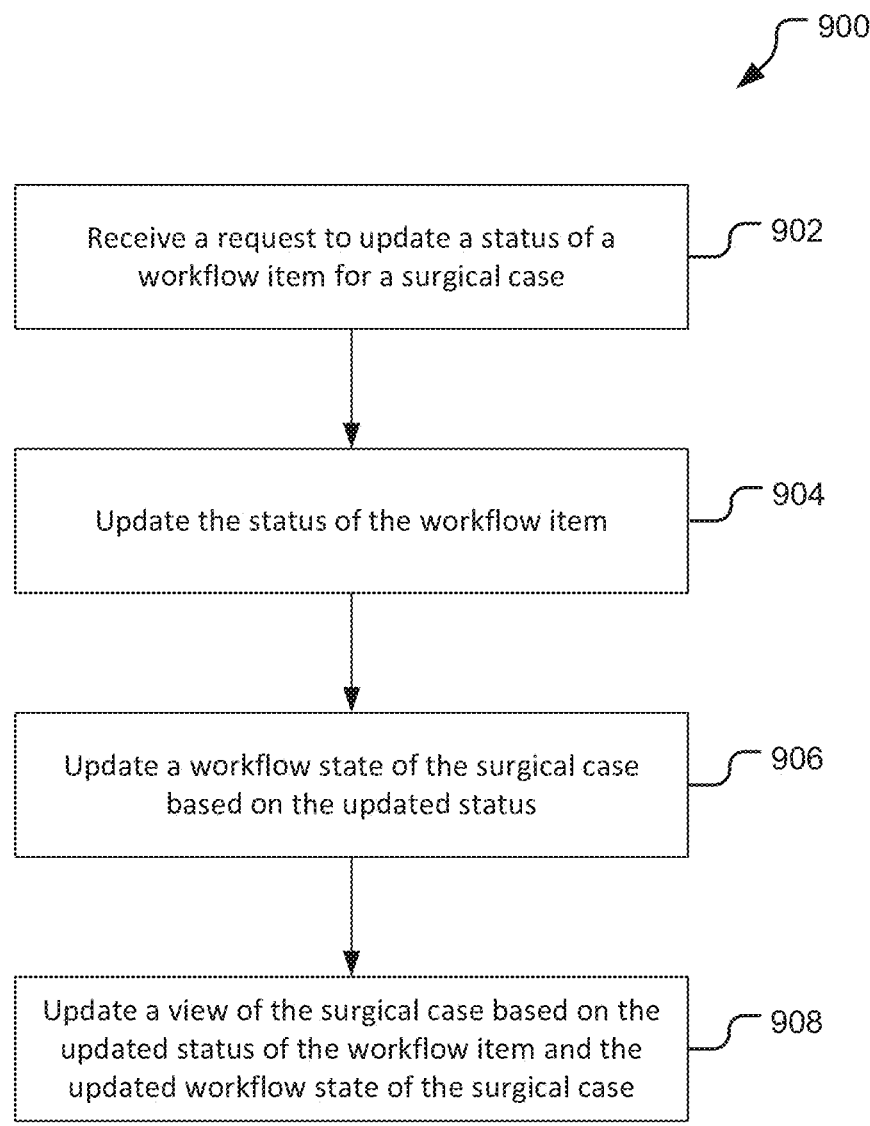
FIG. 10 illustrates an example process for updating a workflow status of a surgical case in accordance with various embodiments of the disclosure.

FIG. 10 illustrates an example process 900 for updating a workflow status of a surgical case in accordance with various embodiments of the disclosure. The surgical coordination system 102 receives a request to update a status of a workflow item for a surgical case at block 902. The request to update the status of a workflow item may be received based on user interaction with, for example, a status indicator presented as part of a user interface generated by the surgical coordination system 102. For example, a user may select (e.g., by clicking with a mouse or pointer or using another defined selection method) a status indicator corresponding to a workflow item displayed with case view 302*c* in the user interface 300. In some examples, selecting the status indicator may update the workflow item to a defined next state (e.g., from not begun to in-progress). In some examples, selecting the status indicator may display an additional interface or menu by which the user selects a new status for the workflow item represented by the status indicator.

The request may further be generated by user interaction with other user interfaces generated by the surgical coordination system 102. For example, where the surgical coordination system 102 provides an interface for a provider to enter operative notes, the request to update the "op note" workflow item may be received by user interface configuration 126 when an operative note is entered and signed by the provider using the interface presented by the surgical coordination system 102. Where the request to update a status for a workflow item is received via a user interface to the surgical coordination system 102, user interface configuration 126 may receive the request and may perform the update and/or pass the request to the management system interface 124 or another component of the surgical coordination system 102.

In some examples, the request to update the state or status of a workflow item may be received by the management system interface 124 based on a corresponding update to one or more items at a medical management system 118. For example, a post-op order workflow item may be updated responsive to entry of post-op notes in electronic medical records 106. Where the request to update a status for a workflow item is received via the management system interface 124, the management system interface 124 may perform the update and/or may pass the request to another component of the surgical coordination system 102.

At block 904, the surgical coordination system 102 updates the status of the workflow item. The status of the workflow item may be updated by, for example, updating the status associated with the workflow item in the case data associated with the case. In some examples, updating the status may further include accessing instructions stored with workflow data 132 to determine how the status should be updated. For example, where the status of an operative note workflow item is updated responsive to entry of an operative note, updating the status of the workflow item may include verifying that required fields of the operative note are filled in and/or contain expected information (e.g., correct patient identifier). Where the op note passes these checks, the status may be updated to complete. Where one or more items are missing and/or may be inaccurate, the status of the workflow item may be updated to needs additional information.

The surgical coordination system 102 updates a workflow state of the surgical case based on the updated status at block 906. In various examples, updating the workflow state may include determining the workflow state for the surgical case based on the new status of each workflow item in the workflow. The determination may be made according to instructions stored with workflow data 132, in some examples.

At block 908, the surgical coordination system 102 updates a view of the surgical case based on the updated status of the workflow item and the updated workflow state of the surgical case. The user interface configuration 126 may access the updated workflow state and state or status of the workflow item to update a case view (e.g., case view 302c). The updated case view may include updates to a status indicator corresponding to the workflow item and/or updates to a high level status indicator. For example, where the surgical coordination system 102 updated a status of a second workflow item associated with the second status indicator of the case view 302c, user interface configuration 126 may render the second status indicator to reflect the updated status (e.g., a complete status) and the high level status indicator 306c to reflect that the pre surgical workflow items are complete and the case now has a status reflecting no additional actions needed prior to the procedure. In some examples, a high level status indicator may not be updated at block 908. For example, a case may have multiple workflow items with a status of urgent attention needed and a high-level status of urgent attention needed. Where one workflow item is updated to a complete status, the case as a whole may still have a high-level status of urgent attention needed.

Figure 11:
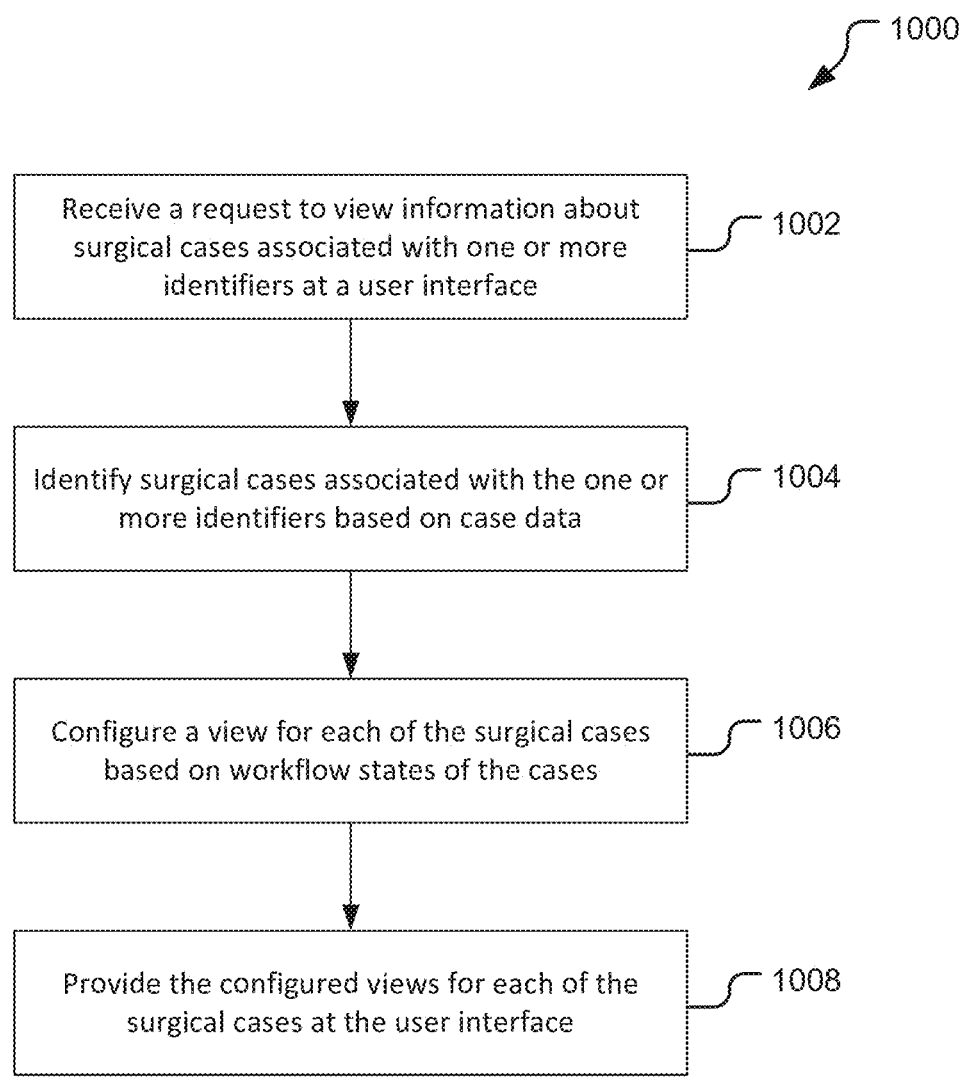
FIG. 11 illustrates an example process for viewing surgical cases in accordance with various embodiments of the disclosure.

FIG. 11 illustrates an example process 1000 for viewing surgical cases in accordance with various embodiments of the disclosure. At block 1002, the surgical coordination system 102 receives a request to view information about surgical cases associated with one or more identifiers at a user interface. The request may generally be received via a user interface and may, accordingly, be initially received by user interface configuration 126. In some examples, user interface configuration 126 may perform additional operations, such as verifying user credentials and/or permissions before proceeding to block 1004.

At block 1004, the surgical coordination system 102 identifies surgical cases associated with the one or more identifiers based on case data. User interface configuration 126 may query case data 128 to identify cases associated with the identifiers. In some examples, user interface configuration 126 may query the case data 128 in a particular order based on precedence or breadth of the identifiers. For example, where both a patient and provider identifier are provided with the request, user interface configuration 126 may first identify cases associated with the patient, as there are likely fewer cases associated with the patient. Similarly, where, as in user interface 500, the cases displayed are based on a temporal identifier, user interface configuration 126 may first identify cases associated with the provider. In some examples, user interface configuration 126 may identify cases associated with multiple identifiers in other orders (e.g., based on an order of the identifiers in the request).

User interface configuration 126 may identify surgical cases associated with an identifier in multiple ways, which may be dependent on the type of identifier presented. For example, where a provider identifier is included in the request, user interface configuration 126 may identify all cases associated with the provider identifier (e.g., using a provider object or structure). Where a temporal identifier is provided, user interface configuration 126 may reference appointments associated with the temporal identifier (e.g., with dates falling within a provided week or on a provided day). Where a practice identifier is provided, user interface configuration 126 may identify all cases and/or appointments associated with the practice group.

The surgical coordination system 102 configures a view for each of the surgical cases based on workflow states of the cases at block 1006. In various examples, user interface configuration 126 may configure case views based on case data 128. User interface configuration 126 may further configure case views based on user settings which may apply across organizations, types of users, and/or the particular user requesting the view. Configuration of a case view for each surgical case may include determining case data 128 to be displayed, rendering status indicators in accordance with the workflow state of the surgical case and/or statuses of individual workflow items in the workflow. In various examples, the case data 128 displayed may be determined based on user permissions or access levels, the type of device requesting the interface (e.g., mobile or desktop), requested views (e.g., a list view, calendar view, and/or detailed views), and/or other factors. For example, for a request from a provider from a mobile device, user interface configuration 126 may include patient name, age, procedure type, status, procedure type, and location in the displayed case data, but may not include patient contact information or insurance information with the displayed case data. A request for the same case view from an insurance coordinator may include diagnostic codes for the procedure, insurance information for the patient, and provider. Accordingly, views may be configured to provide data most likely to be requested by certain types of users. Similarly, user interface configuration 126 may configure options for user interaction with, for example, status elements or indicators, based on user type or permissions. For example, some users may view status elements without permissions to request updates to status elements.

At block 1008, the surgical coordination system 102 provides the configured views for each of the surgical cases at the user interface. User interface configuration 126 may arrange the case views according to the request (e.g., in a calendar, sorted by location) and provide the user interface to the requesting device. In some examples, the configured views may be presented differently based on the type of requesting device. For example, a view responsive to the same request may be displayed differently (e.g., with less detail) for a mobile device and a desktop or laptop computer.

Figure 12:
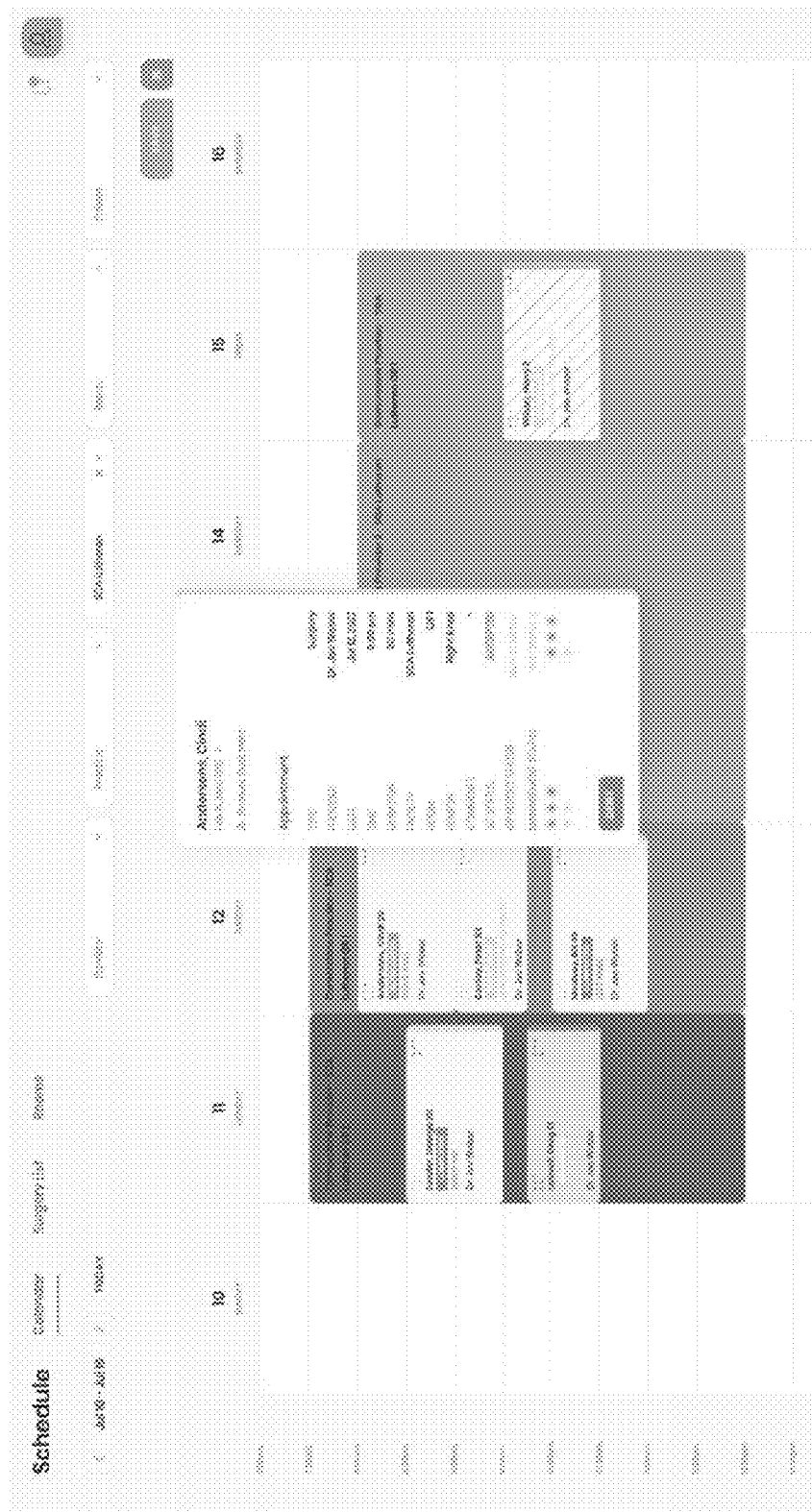
FIG. 12 illustrates an example user interface displaying surgical case data in a calendar view in accordance with various embodiments of the disclosure.
Figure 13:
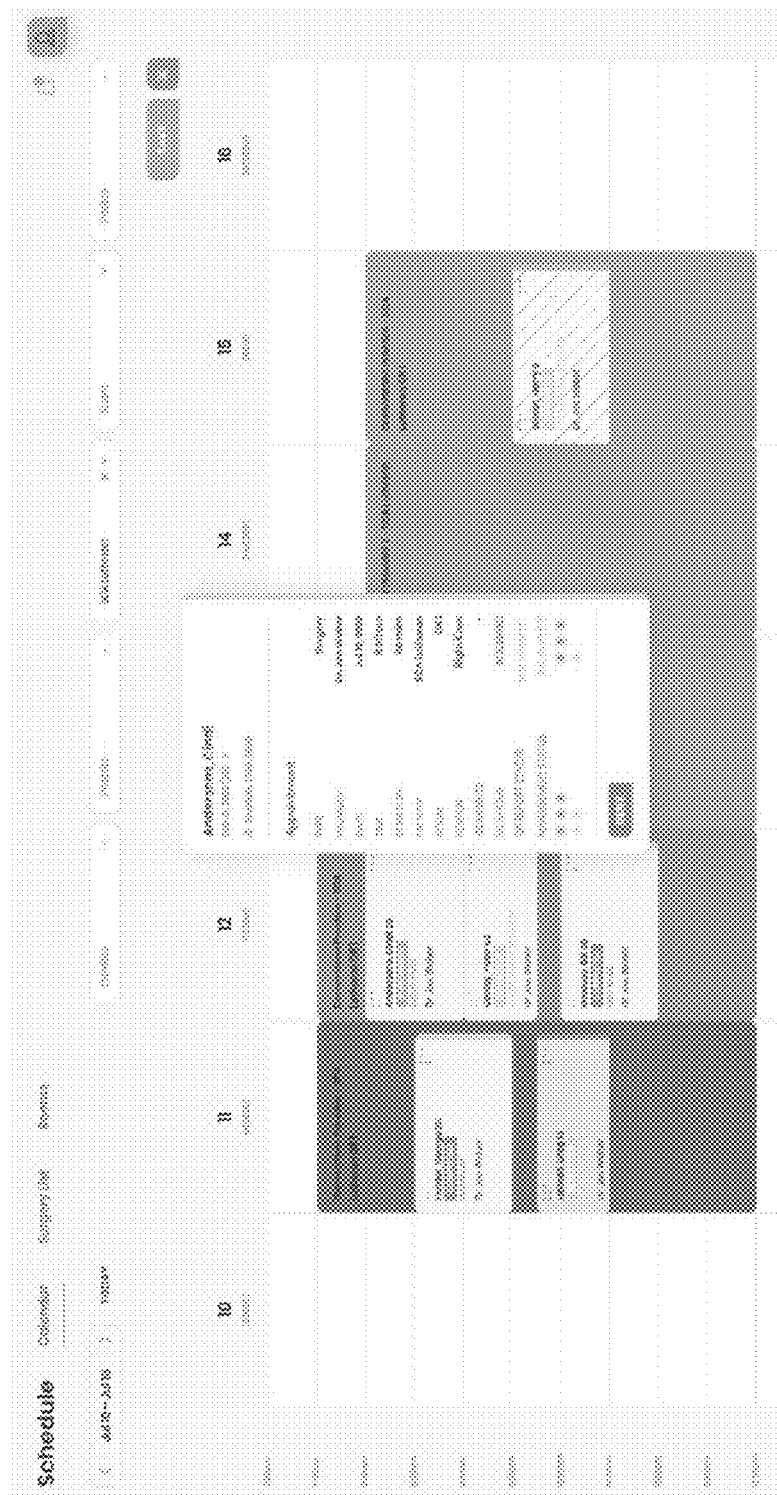
FIG. 13 illustrates an example user interface displaying surgical case data in a calendar view in accordance with various embodiments of the disclosure.

FIG. 12 illustrates an example user interface 1100 displaying surgical case data in a calendar view. As shown in the user interface 1100, various colors may be used as differentiators to reflect differing case statuses, blocks, statuses of action items related to or associated with surgical cases, and the like. Further, color may be used in conjunction with other visual elements, such as patterns, shading, and the like. User interface 1100 may include surgical cases and other elements similar or substantially the same as those described with respect to user interfaces 300, 400, 600, and/or 700. FIG. 13 illustrates an example user interface 1200 displaying surgical case data in a calendar view. The user interface 1200 shows the same or similar elements as the user interface 1100 without color. Accordingly, the user interface 1200 uses varying shades in place of difference colors. In various examples, differing patterns, gradients, or other visual elements may be used to differentiate status.

According to the above examples, the surgical coordination system 102 may provide a centralized system for tracking common items involved in scheduling and managing surgery and procedures. The surgical coordination system 102 may communicate with several medical management systems to obtain and provide data to improve record consistency, simplify administration, and improve provider, administrator, and patient experience with scheduling and managing surgical procedures at surgical centers.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A method of displaying information relating to a surgical case, the method comprising:
receiving a request to create the surgical case corresponding to a patient identifier and a provider identifier;
associating one or more of patient data or provider data with the surgical case based on the patient identifier or the provider identifier;
transmitting, to a medical management system, a query for case data, the query comprising one or more of the patient identifier or the provider identifier;
receiving the case data from the medical management system;
initializing a workflow state for the surgical case by setting statuses for preconfigured workflow items based on the case data;
transmitting, to a user device, a user interface, the user interface configured to display a view of the surgical case, wherein the view of the surgical case displays at least a portion of the case data and one or more status elements configured based on the workflow state for the surgical case, wherein a visual appearance of each of the one or more status elements indicates the statuses of the preconfigured workflow items;
receiving, from the user device or the medical management system, an update to a preconfigured workflow item in the preconfigured workflow items to produce an updated workflow item;
responsively updating a status associated with the updated workflow item;
automatically updating a status element in the one or more status elements to produce an updated status element, the updated status element configured to indicate an updated status of the updated workflow item; and
transmitting, to the user device, an updated user interface configured to display an updated view of the surgical case, the updated view of the surgical case displaying the one or more status elements including the updated status element, wherein the visual appearance of the updated status element is changed by changing at least one of a color or a pattern of the updated status element to indicate the updated status of the updated workflow item.

2. The method of claim 1, further comprising updating the workflow state for the surgical case based on a request to update the status of the preconfigured workflow item of the preconfigured workflow items to be updated.

3. The method of claim 2, wherein the request to update the status of the preconfigured workflow item of the preconfigured workflow items is generated responsive to an update at the medical management system.

4. The method of claim 1, wherein the user interface is configured to display the view of the surgical case on a calendar view overlaid with the at least a portion of the case data.

5. The method of claim 1, wherein receiving the case data comprises:
identifying an empty field of the case data; and
transmitting a query to the medical management system based on a link between the empty field and the medical management system and schema data of the medical management system.

6. The method of claim 1, wherein the request to create the case is received from an additional medical management system.

7. The method of claim 1, wherein the view of the surgical case is configured to:
indicate a status of an appointment; and
display a case stage associated with a stage of the surgical case.

8. The method of claim 7, wherein a visual appearance of the view is configured to indicate the status of the appointment using at least one of different colors or different patterns.

9. A method of configuring a user interface including information about surgical views, the method comprising:
receiving a request to render views of the surgical cases associated with one or more identifiers at a user interface;
identifying the surgical cases associated with the one or more identifiers based on case data associated with the surgical cases;
transmitting, to a medical management system, a query for case data associated with the surgical cases using at least one of the one or more identifiers;
receiving the case data from the medical management system;
configuring, by a processor, a view for each of the surgical cases, wherein the views display at least a portion of the case data associated with the surgical cases and one or more status elements configured based on a workflow state for the surgical cases, each status element indicating a status of a respective workflow item in the workflow state, wherein a visual appearance of a status element of the one or more status elements indicates a workflow item associated with the status element is not ready to be completed;

providing, by the processor, the configured views to the user interface;

transmitting the user interface to a user device;

receiving, from the user device, a user interaction with a view associated with the status element;

based on the user interaction, transmitting, to the user device, an updated user interface configured by the processor to display a detailed view of the workflow item associated with the status element, the detailed view presenting additional information about the workflow item and at least the status element associated with the workflow item;

receiving, from the user device or the medical management system, an update to the workflow item that indicates the workflow item is in process;

responsively updating, by the processor, the status associated with the workflow item to indicate the workflow item is in process;

automatically updating, by the processor, the user interface by changing the visual appearance of the status element displayed in the user interface and in the detailed view of the workflow item from a first visual appearance to a second visual appearance by changing at least one of a color or a pattern of the status element; and transmitting the user interface to the user device.

10. The method of claim 9, wherein the one or more identifiers include a provider identifier and a temporal identifier, wherein the surgical cases associated with the one or more identifiers are identified by identifying the surgical cases associated with the temporal identifier from a set of surgical cases associated with the provider identifier.

11. The method of claim 9, further comprising updating the view of the surgical case by reconfiguring a high level status element based on updating the status associated with the workflow item.

12. The method of claim 11, wherein:
the configured views are displayed at the user interface on a calendar view;
the configured views are overlaid on the calendar view; and
reconfiguring the high level status element comprises changing, by the processor, a visual appearance of the high level status element from a third visual appearance to a fourth visual appearance by changing at least one of a color or a pattern of the high level status element.

13. The method of claim 12, wherein:
the at least one of the color or the pattern of the status element is at least one of a first color or a first pattern of the status element;
the update is a first update; and
the method further comprises:
  receiving, from the user device or the medical management system, a second update to the workflow item that indicates completion of the workflow item;
  responsively updating, by the processor, the status associated with the workflow item to indicate the completion of the workflow item;
  automatically updating, by the processor, the user interface by changing the visual appearance of the status element displayed in the user interface from the second visual appearance to a fifth visual appearance to indicate the completion of the workflow item, wherein the second visual appearance changes to the fifth visual appearance by changing at least one of the first color to a second color or the first pattern to a second pattern; and
  transmitting the user interface to the user device.

14. The method of claim 13, wherein:
the at least one of the color or the pattern of the high level status element is at least one of a first color or a first pattern of the high level status element; and
the method further comprises updating, by the processor, the view of the surgical case by changing the visual appearance of the high level status element from the first visual appearance to a second visual appearance by changing at least one of the first color to a second color or the first pattern to a second pattern of the high level status element.

15. The method of claim 9, wherein the portion of the case data comprises one or more of a patient name, a descriptor of the surgical case, an age of a patient, a case stage of the surgical case, a name of a provider, a date, or a time of day.

16. One or more non-transitory computer readable media encoded with instructions which, when executed by one or more processors of a surgical coordination system, cause the surgical coordination system to:
receive a request to create a surgical case corresponding to a patient identifier and a provider identifier;
associate one or more of patient data or provider data with the surgical case based on the patient identifier or the provider identifier;
transmit, to a medical management system, a query for case data, the query comprising one or more of the patient identifier or the provider identifier, wherein the query includes first fields that map to second fields associated with schema data of the medical management system;
receive the case data from the medical management system;
initialize a workflow state for the surgical case by setting statuses for preconfigured workflow items based on the case data;
transmit, to a user device, a user interface, the user interface configured to display a view of the surgical case, wherein the view of the surgical case displays at least a portion of the case data and:
  one or more first status elements configured based on the workflow state for the surgical case, the one or more first status elements configured to indicate the statuses of the preconfigured workflow items, wherein a first status element in the one or more first status elements that is associated with a workflow item in the preconfigured workflow items includes a first visual appearance that indicates the workflow item is not completed, the first visual appearance comprising at least one of a first color or a first pattern; and
  a second status element configured to indicate a status of the surgical case as a whole, wherein the second status element includes a second visual appearance that indicates the surgical case needs attention, the second visual appearance comprising at least one of the first color or the first pattern;
receive, from the user device or the medical management system, an update to the workflow item in the preconfigured workflow items to produce an updated workflow item;

responsive to the update, update a status of the workflow item to produce an updated status, the updated status indicating the workflow item is completed;

automatically update the first status element in the one or more first status elements to produce an updated first status element, the updated first status element configured to indicate the updated status of the updated workflow item;

automatically update the second status element to produce an updated second status element, the updated second status element configured to indicate an updated status of the surgical case; and transmit, to the user device, an updated user interface configured to display an updated view of the surgical case, the updated view of the surgical case displaying the updated second status element and the one or more first status elements including the updated first status element, wherein:
- the updated first status element includes a third visual appearance different from the first visual appearance of the first status element to indicate the workflow item is completed, the third visual appearance comprising at least one of a second color or a second pattern; and
- the updated second status element includes a fourth visual appearance different from the second visual appearance of the second status element to indicate the surgical case is proceeding as scheduled, the fourth visual appearance comprising at least one of the second color or the second pattern or a third color or a third pattern.

17. The computer readable media of claim 16, wherein the instructions further cause the surgical coordination system to update the workflow state for the surgical case based on a request to update the status of the preconfigured workflow item of the preconfigured workflow items.

18. The computer readable media of claim 16, wherein:
the query is a first query; and
the instructions causing the one or more processors to receive the case data further cause the one or more processors to:
identify an empty field of the case data; and
transmit a second query to the medical management system based on a link between the empty field and the medical management system and the schema data of the medical management system.

19. The computer readable media of claim 16, wherein the request to create the case is received from an additional medical management system.

20. The one or more non-transitory computer readable media of claim 16, wherein the instructions further cause the one or more processors to:
receive, from the user device, a user interaction with a second status element of the one or more first status elements; and
based on the user interaction, transmit, to the user device, an updated user interface configured to display a detailed view of a workflow item associated with the second status element, the detailed view presenting additional information associated with the workflow item.

* * * * *